United States Patent

Shimoda

[11] Patent Number: 5,774,286
[45] Date of Patent: Jun. 30, 1998

[54] MAGNETIC DISK DRIVE IN WHICH READ DATA IS DEMODULATED USING MAXIMUM LIKELIHOOD DETECTION METHOD

[75] Inventor: Kaneyasu Shimoda, Kawasaki, Japan

[73] Assignee: Fujitsu Limited, Kawasaki, Japan

[21] Appl. No.: 691,428

[22] Filed: Aug. 2, 1996

Related U.S. Application Data

[63] Continuation of Ser. No. 271,656, Jul. 7, 1994, abandoned.

[30] Foreign Application Priority Data

Oct. 13, 1993 [JP] Japan ................................... 5-255684

[51] Int. Cl.⁶ .................................................. G11B 5/09
[52] U.S. Cl. .......................... 360/46; 375/290; 375/340
[58] Field of Search ................................ 360/46, 27, 40, 360/61, 65; 341/57, 94; 371/43, 57.2; 375/243, 254, 365, 290, 372, 341, 340

[56] References Cited

U.S. PATENT DOCUMENTS

| | | | |
|---|---|---|---|
| 4,161,719 | 7/1979 | Parikh et al. | 375/365 |
| 4,462,101 | 7/1984 | Yasuda et al. | 371/43 |
| 4,502,143 | 2/1985 | Kato et al. | 371/57.2 |
| 4,504,872 | 3/1985 | Petersen | 360/40 |
| 4,918,446 | 4/1990 | Yagi | 341/94 |
| 4,984,100 | 1/1991 | Takayama et al. | 360/49 |

*Primary Examiner*—Aristotelis M. Psitos
*Assistant Examiner*—Patrick Wamsley
*Attorney, Agent, or Firm*—Armstrong, Westerman, Hattori, McLeland & Naughton

[57] ABSTRACT

In a magnetic disk drive for writing write data by a head to a magnetic disk, equalizing a reproduced signal read out from the magnetic disk by a head at the time of reproduction, and effecting maximum likelihood detection for the reproduced signal after equalization and thus demodulating the read data, "1s" are periodically inserted as dummy bits into a data string of the write data. On the other hand, a timing signal and a clock signal which are synchronous with the positions of the dummy bits are generated from the reproduced signals after equalization, and a threshold level of binary/ternary judgement is switched by this timing signal. Binary judgement is made at the position of the dummy bit in the reproduced signal after equalization and path merge is unconditionally regarded as existing at the position of the dummy bit in the reproduced signal after equalization, and path retrieval is made, while ternary judgement is made for other code strings to execute maximum likelihood detection. As a result, in a magnetic disk drive for demodulating the read data by the maximum likelihood detection method, error propagation can be reduced, the encoding gain can be improved and a high speed maximum likelihood detection can be accomplished.

19 Claims, 24 Drawing Sheets

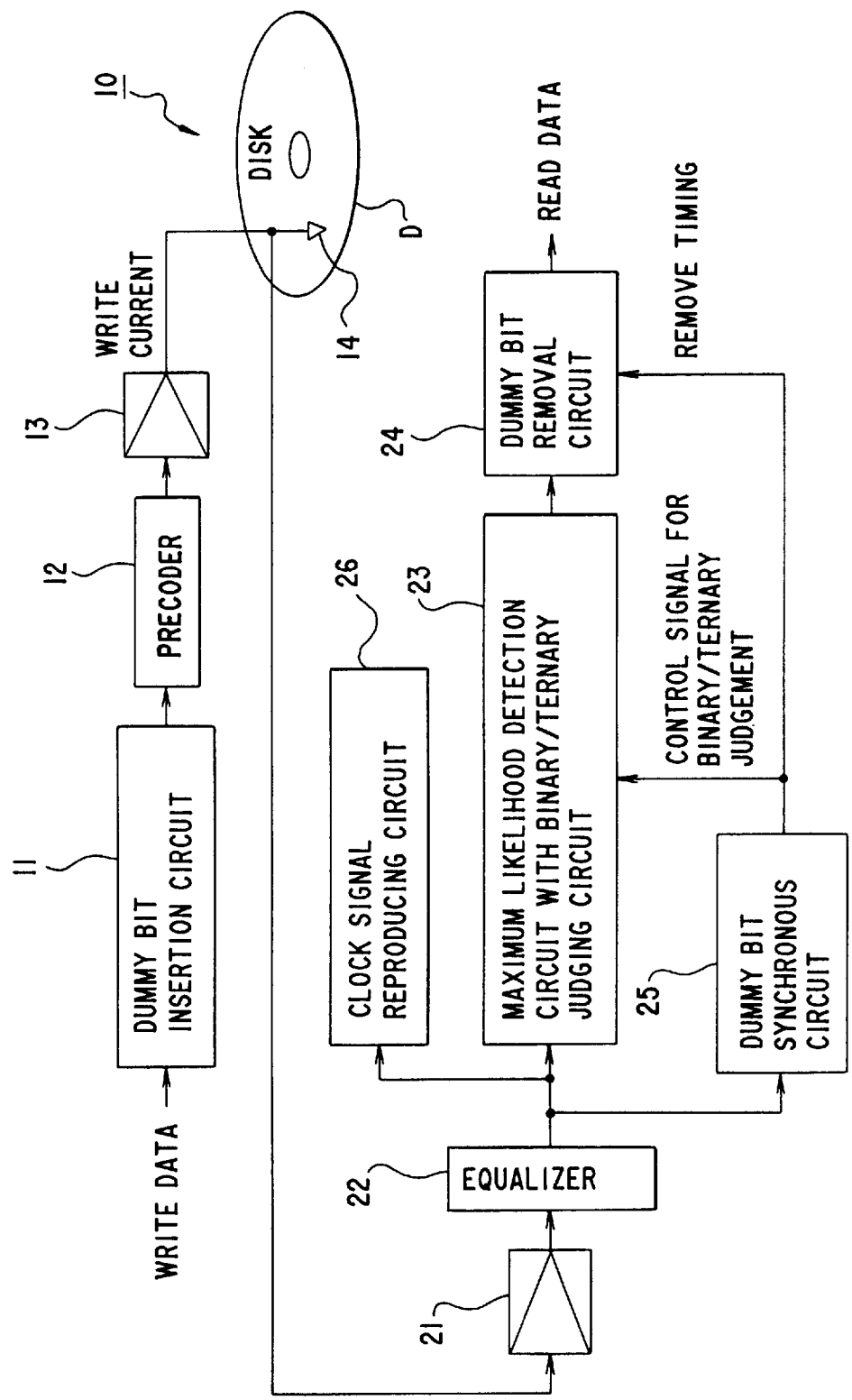

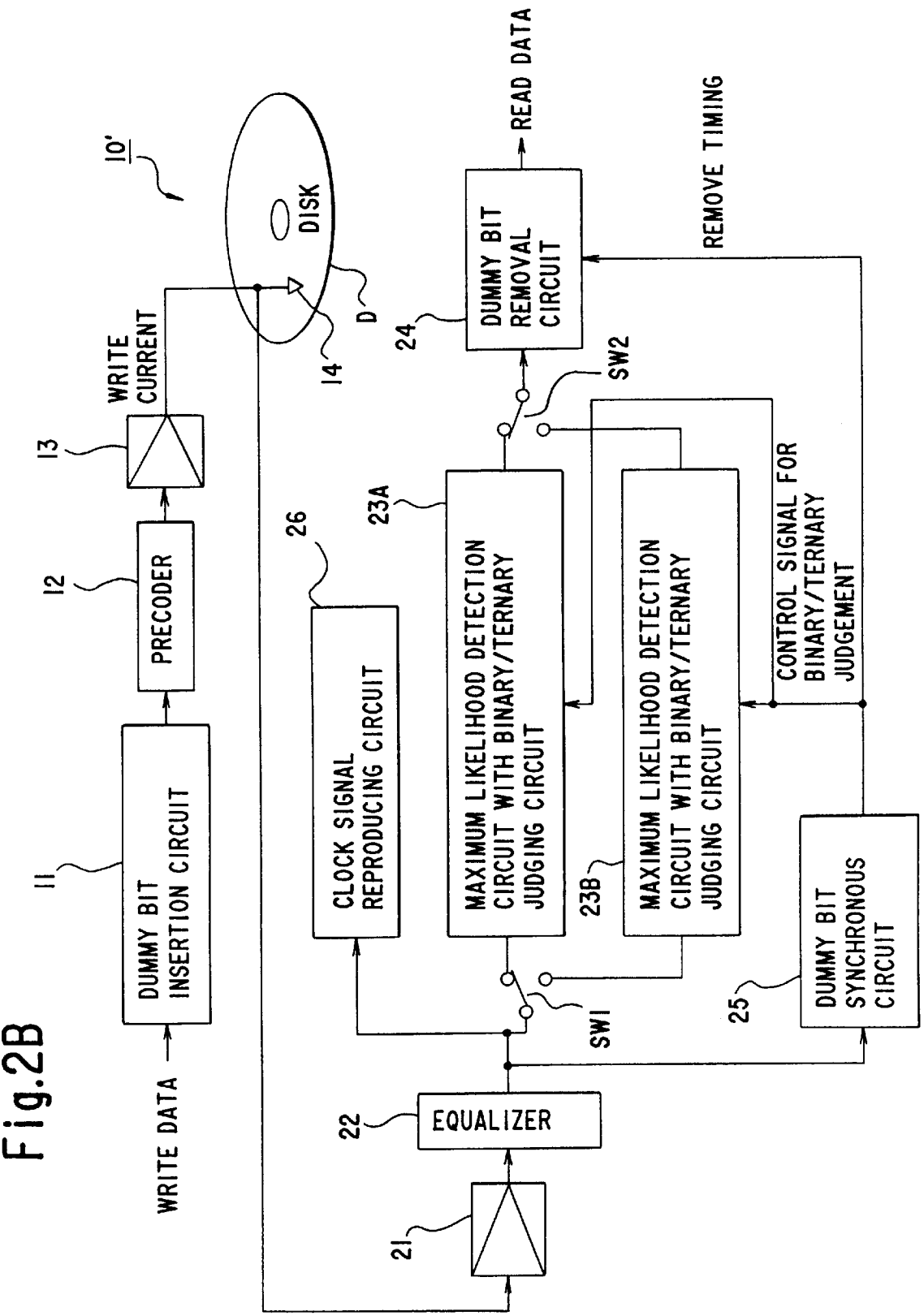

Fig.6A     1 0 0 1 1 0 1 1
Fig.6B    1 1 0 0 1 1 1 0 1 1

Fig.6C $\begin{cases} \dfrac{1}{1+D} & 1\ 0\ 0\ 0\ 1\ 0\ 1\ 1\ 0\ 1 \\ \dfrac{1}{1-D} & 1\ 1\ 1\ 1\ 0\ 0\ 1\ 0\ 0\ 1 \end{cases}$

EVEN LINE

ODD LINE

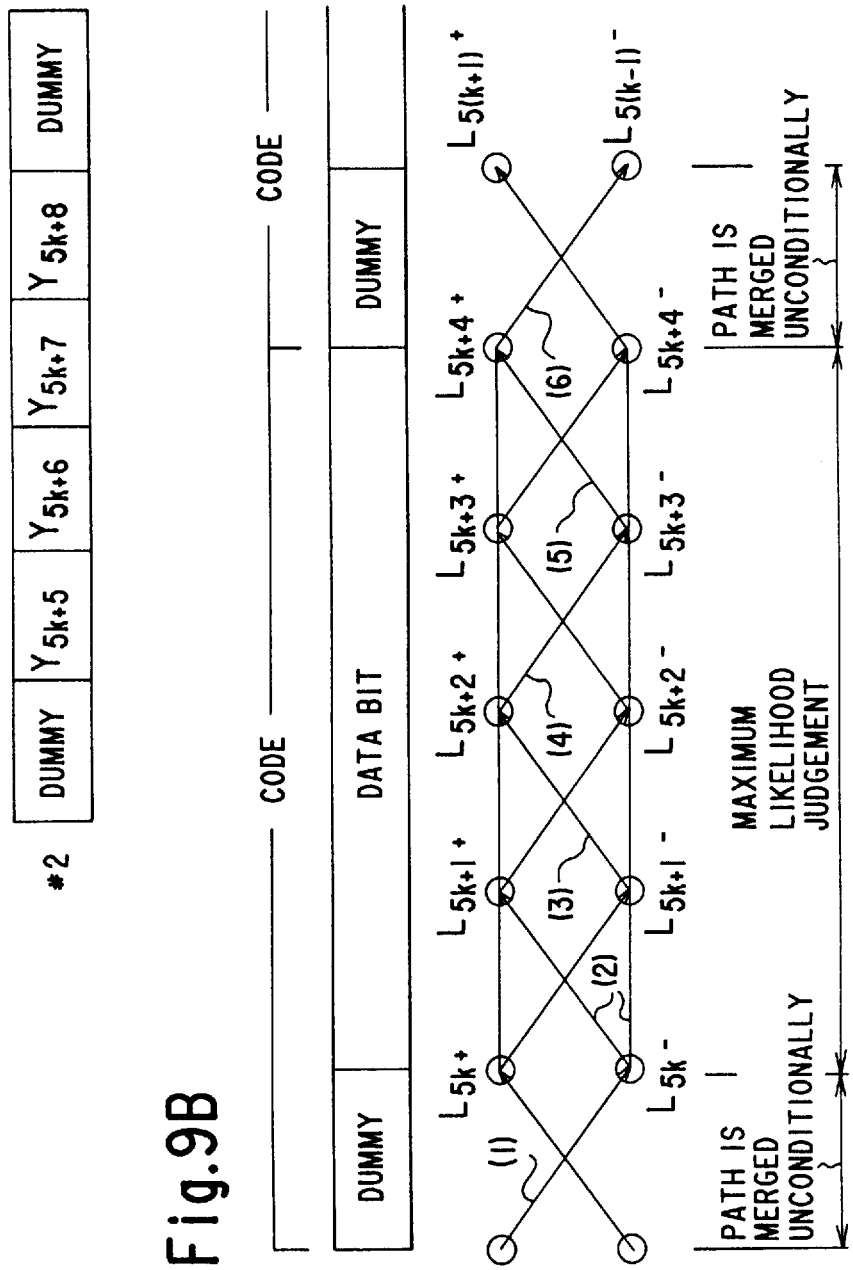

5,774,286

MAGNETIC DISK DRIVE IN WHICH READ DATA IS DEMODULATED USING MAXIMUM LIKELIHOOD DETECTION METHOD

This application is a continuation of application Ser. No. 08/271,656 filed Jul. 7, 1994, now abandoned.

BACKGROUND OF THE INVENTION

1. Field of the Invention

This invention relates to a magnetic disk drive. More particularly, the present invention relates to a recording/reproduction apparatus which is directed to attain demodulation at a higher speed and reduction of error propagation by an improved detection system for encoding and reproduction during recording to a magnetic disk, in a magnetic disk drive, for demodulating read data using a maximum likelihood detection method.

2. Description of the Related Art

Conventionally, a partial-response signaling and maximum likelihood detection system comprising the combination of partial-response and maximum likelihood detection [PRML (Partial Response Maximum Likelihood) system] has been used to accomplish a compact and large-capacity magnetic disk drive. According to this PRML system, data are encoded and written in a recording disk. In order to reproduce the read data from the magnetic disk, the maximum likelihood detection method is used to demodulate a reproduced signal and obtain data. In the PRML system, However, there is the limitation to the number of consecutive zeros (0s) in a single string in order to readily reproduce clocks on the read side. A partial response class 4 signaling technique employs a run length limited code (RLL code) involving a limit to the number of consecutive 0s in the odd-numbered and even-numbered sequences. Accordingly, the PRML system cannot improve the demodulation speed, and furthermore, involves the problem that error propagation is great. These problems will be explained in connection with a magnetic disk drive 90 shown in FIG. 1.

FIG. 1 shows the construction of a conventional magnetic disk drive 90 that employs the recording/reproducing system comprising the combination of partial-response class 4 signaling and maximum likelihood detection technique (which will be hereinafter referred to as the "PR4ML system").

In the magnetic disk drive 90 employing the conventional PR4ML-method, write data are encoded in conformity with an 8-to-9 (0, 4, 4) rule by an 8/9 converter 91. The encoded data are supplied to a precoder 92 and to a write amplifier 93, and is then recorded to a disk D. During reproduction, a signal read from the disk D by a head 94 is amplified by a head amplifier 95, and is equalized by an equalizer 96. The equalized signal is then supplied to maximum likelihood detectors 93A and 93B while it is decomposed into odd-and even-numbered data sequences, and maximum likelihood detection is effected. Detected data are supplied to the 8/9 converter 99 for 8-to-9 conversion, and is restored to the original data. Reference numeral 97 denotes a clock pulse reproducing circuit, and symbols SW1 and SW2 denote selection switches for selecting the maximum likelihood detectors 98A and 98B.

Here, the term "8-to-9 (0, 4, 4) code" represents those codes which are restricted in such a manner that an encoding ratio of a data length to a code length is 8:9 (8 is a data length and 9 is a code length), and the number of consecutive 0s in an odd-numbered or even-numbered data sequence is not greater than 4. For partial-responses other than the class 4, 8-to-9 (0, 4) encoding is employed, and the number of consecutive 0s in a data sequence is not greater than 4.

However, the magnetic recording reproducing apparatus based on the combination of encoding and maximum likelihood sequence detection described above involves the following problems:

(1) Since paths are sequentially retrieved in maximum likelihood detection, the maximum likely path cannot be stipulated while the code 0s continue.

(2) Stipulation of the maximum likely path cannot be made before the junction point of the paths. Therefore, path retrieval cannot be finished at an intermediate stage, and a transfer rate cannot be improved.

(3) Even if an error in maximum likelihood detection is one bit, the error propagates in the 8-bit unit after 8/9 conversion. Accordingly, error propagation is great. To prevent this error propagation, a powerful error correction code (ECC) mechanism must be added, so that the drive becomes more complicated in construction.

SUMMARY OF THE INVENTION

It is therefore an object of the present invention to provide a magnetic disk drive which can reduce error propagation, can improve a gain of encoding, and furthermore, can improve the detection speed in maximum likelihood detection.

In a magnetic disk drive for writing data to a magnetic disk by write means and a head, equalizing a reproduced signal read out from the magnetic disk by a head by using equalization means for reproduced signal at the time of reproduction, effecting maximum likelihood detection for the reproduced signal after equalization and demodulating the read data, the present invention provides a magnetic disk drive comprising dummy bit insertion means for periodically inserting "1s" as dummy bits into a write data string, disposed at a pre-stage of data write means, maximum likelihood detection means with binary/ternary judging circuit which is disposed at a post-stage of the equalization means of the reproduced signal, switches a threshold level of the reproduced signal after equalization by a timing signal from outside, effects binary judgement at the positions of the dummy bits, makes path retrieval at the positions of the dummy bits by regarding the state that a path merge unconditionally exists, effects ternary judgement in other code strings and thus effects maximum likelihood detection, dummy bit removal means for removing the dummy bits from the output signal of the maximum likelihood detection means with binary/ternary judging circuit, a dummy bit synchronous circuit disposed at a post-stage of the equalization means of the reproduced signal, generating a timing signal synchronous with the position of the dummy bit in the reproduced signal after equalization and outputting this timing signal to the maximum likelihood detection means with binary/ternary judging circuit and to the dummy bit removal means, and clock signal reproducing means for reproducing a clock signal from the reproduced signal after equalization.

In the magnetic disk drive according to the present invention, "1" is periodically inserted as the dummy bits into the data string before the write data is written into the magnetic disk by the data write means and the head. When the data into which the dummy bits "1" are periodically written is read out by the head, the reproduced signal is first equalized by the equalization means of the reproduced signal, and the reproduced signal is then divided into two signals. One of the reproduced signals is inputted to the dummy bit synchronous means, and a timing signal which is synchronous with the position of the dummy bit in the reproduced signal after equalization is generated from this reproduced signal. This timing signal is outputted to the maximum likelihood detection means with binary/ternary judging circuit and to the dummy bit removal means. The other reproduced signal is subjected to binary judgement at the position of the dummy bit by the maximum likelihood detection means with binary/ternary judging circuit the threshold level of which is switched by the timing signal, and path retrieval is made by regarding the state that path merge unconditionally exists. Ternary judgement is made for other code strings and maximum likelihood detection is made. The output signal of this maximum likelihood detection means with binary/ternary judging circuit is inputted to the dummy bit removal means, and the dummy bits are removed in accordance with the timing signal described above. By the way, in a partial-response class 4 technique, the equalized signal is separated into an odd-numbered string and an even-numbered string in the maximum likelihood detection means with binary/ternary judging circuit, and maximum likelihood detection is carried out.

As described above, in a magnetic disk drive for demodulating the read data by the maximum likelihood detection method, the present invention can reduce error propagation, and can improve an encoding gain. Further, a higher detection speed of maximum likelihood detection can be improved by parallel processing of maximum likelihood detection, and a transfer rate can be easily improved.

BRIEF DESCRIPTION OF THE DRAWINGS

The present invention will be more clearly understood from the description as set forth below with reference to the accompanying drawings, wherein:

FIG. 2A is a block circuit diagram showing the construction of a magnetic disk drive according to the first embodiment of the present invention;

FIG. 2B is a block circuit diagram showing the construction of a modified embodiment of the first embodiment of the present invention;

FIGS. 6A to 6G explain the flow of signals at each portion of the magnetic disk drive shown in FIGS. 2A and 2B, wherein:

FIG. 6A shows a data signal to the magnetic disk drive;

FIG. 6B shows a data signal after insertion of a dummy bit;

FIG. 6C shows an output signal of the precoder;

FIG. 6D shows a write current to the magnetic disk;

FIG. 6E shows a waveform read out and equalized from a head of the magnetic disk;

FIG. 6F shows a waveform of an odd-numbered sequence in the magnetic disk drive; and FIG. 6G shows a waveform of an even-numbered sequence in the magnetic disk drive;

FIG. 8A explains a code string after equalization in partial-response;

FIG. 8B shows a code string after distribution to even-numbered and odd-numbered sequences in partial-response class 4;

FIG. 9A explains a reproduced signal after distribution to a buffer;

FIG. 9B is a state trellis diagram for the reproduced signal when a dummy bit is inserted thereto;

FIGS. 10A to 10D are state trellis diagrams at the time of judgement of the dummy bit, wherein:

FIG. 10A shows the mode of a change when a certain dummy bit is positive and a next dummy bit is positive;

FIG. 10B shows the mode of a change when a certain dummy bit is positive and a next dummy bit is negative;

FIG. 10C shows the mode of a change when a certain dummy bit is negative and a next dummy bit is positive; and FIG. 10D shows the mode of a change when a certain dummy bit is negative and a next dummy bit is negative;

DESCRIPTION OF THE PREFERRED EMBODIMENTS

Figure 1:
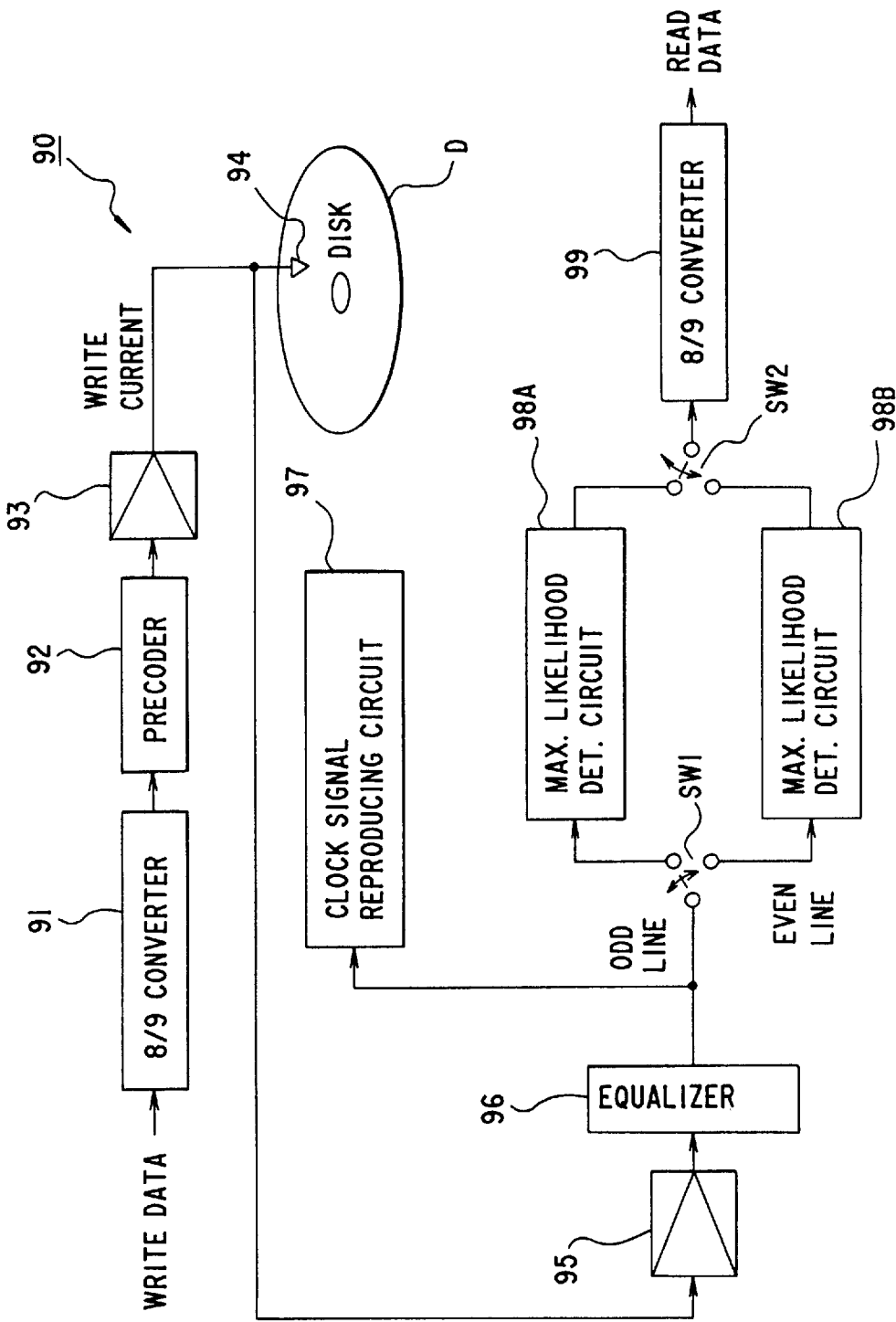
FIG. 1 is a block circuit diagram showing the construction of a partial-response class 4 system magnetic disk drive according to the prior art.

Hereinafter, embodiments of the present invention will be described in detail with reference to the accompanying drawings.

FIGS. 2A and 2B show the construction of the magnetic disk drives 10, 10' in the first embodiment of the present invention. FIG. 2A shows the magnetic disk drive 10 of a recording/reproducing system which comprises the combination of partial-response and maximum likelihood detection. FIG. 2B shows the construction of a magnetic disk drive 10' employing the afore-mentioned PR4ML system comprising the combination of partial-response class 4 and maximum likelihood detection uniformity with the 8/10 (0, 4, 4) code. The difference in construction between the magnetic disk drive 10 comprising the combination of partial-response and maximum likelihood detection shown in FIG. 2A and the magnetic disk drive 10' comprising the combination of the partial-response class 4 with maximum likelihood detection shown in FIG. 2B lies only in that demodulation of the reproduced signal after equalization is effected as such or is effected after being divided into odd-numbered and even-numbered sequences. Accordingly, like reference numerals will be used in FIGS. 2A and 2B to identify like constituents, and the explanation will be given simultaneously.

In the magnetic disk drives 10, 10' shown in FIGS. 2A and 2B, a dummy bit is written into write data by a dummy bit insertion circuit 11. The data after writing of the dummy bit are recorded by a head 14 to a disk D through a precoder 12 and a write amplifier 13.

A signal read from the disk D by the head 14 at the time of reproduction is amplified by a head amplifier 21 and is equalized by an equalizer 22. The equalized signal is subjected to maximum likelihood detection, while it remains in a single sequence, by a maximum likelihood detection circuit 23 with binary/ternary judgement circuit in the magnetic disk drive 10, and in the magnetic disk drive 10' shown in FIG. 2B, it is subjected to maximum likelihood detection for each of the odd-numbered and even-numbered sequences by the maximum likelihood detection circuit 23B with the binary/ternary judging circuit. The detected data after maximum likelihood detection is inputted to a dummy bit removal circuit 24, which removes the dummy bit, and read data can thus be obtained.

The reproduced signal equalized by the equalizer 22 is also inputted to a dummy bit synchronous circuit 25. This dummy bit synchronous circuit 25 contains a counter (not shown) synchronized with the position of the dummy bit, and generates a timing signal which is synchronized with the position of the dummy bit in the reproduced signal after equalization. This timing signal is inputted to the maximum likelihood detection circuit with the binary/ternary judging circuits 23, 23A, 23B and the dummy bit removal circuit 24, respectively. The timing signal is used as a binary/ternary judgement control signal in the maximum likelihood detection circuits with the binary/ternary judging circuit 23, 23A, 23B and is used to remove the dummy bit by the 25 dummy bit removal circuit 24. In other words, the threshold value level of the binary and ternary levels is switched by this timing signal in the maximum likelihood detection circuits 23, 23A, 23B, path retrieval is effected while a base junction is unconditionally regarded as existing by the binary value judgement at the position of the dummy bit and the ternary value judgement is effected in other code sequences and maximum likelihood detection is carried out. The timing bit is used to remove the dummy bit in the dummy bit removal circuit 24.

Reference numeral 26 denotes a clock signal reproducing circuit, and symbols SW1 and SW2 denote selector switches for selecting the maximum likelihood detection circuits 23A, 23B.

The dummy bit insertion circuit 11 is an encoder which inserts a dummy bit "1" into information having a predetermined length. In the case of the 8/10 code, the dummy bit insertion circuit 11 comprises a 4-bit shift register 11a and a 5-bit shift register 11b to which the dummy bit "1" is applied in advance, for example. When a data string "1 0 0 1 1 0 1 1 " is inserted, for example, this dummy bit insertion circuit 11 inserts the dummy bit "1" in every four bits. In the code string outputted from the dummy bit insertion circuit 11, the dummy bit "1" (with the underline) is inserted, as represented in "1 1 0 0 1 1 1 0 1 ", every four bits.

Figure 3A:
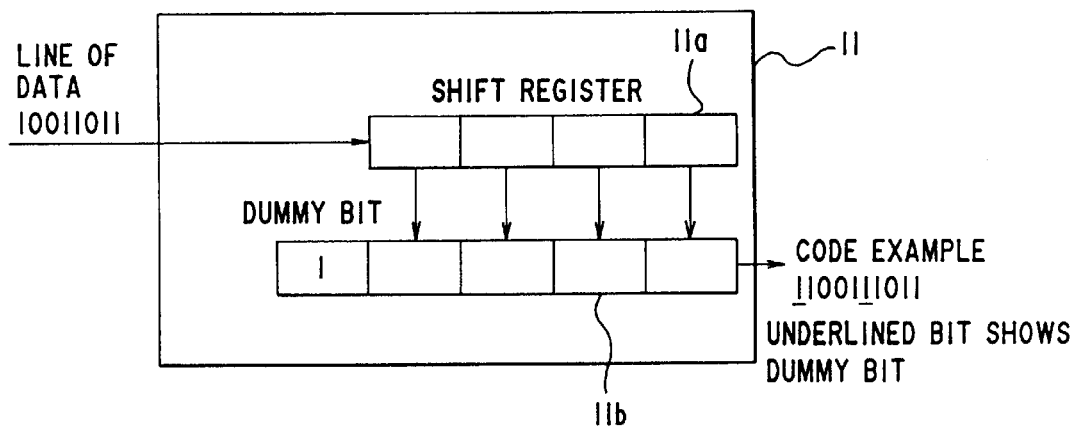
FIG. 3A is a diagram showing an example of the construction of a dummy bit insertion circuit.
Figure 3B:
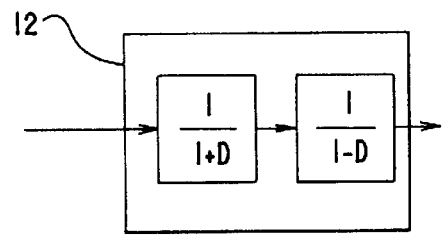
FIG. 3B is a diagram showing an example of the construction of a precoder block of FIG. 2B.

The precoder 12 cancels the differentiation operation between the magnetic disk D and the head 14. In the case of the partial-response class 4, the precoder 12 is equipped with a transmission function $1/(1+D)$, $1/(1-D)$ as shown in FIG. 3B.

Figure 4:
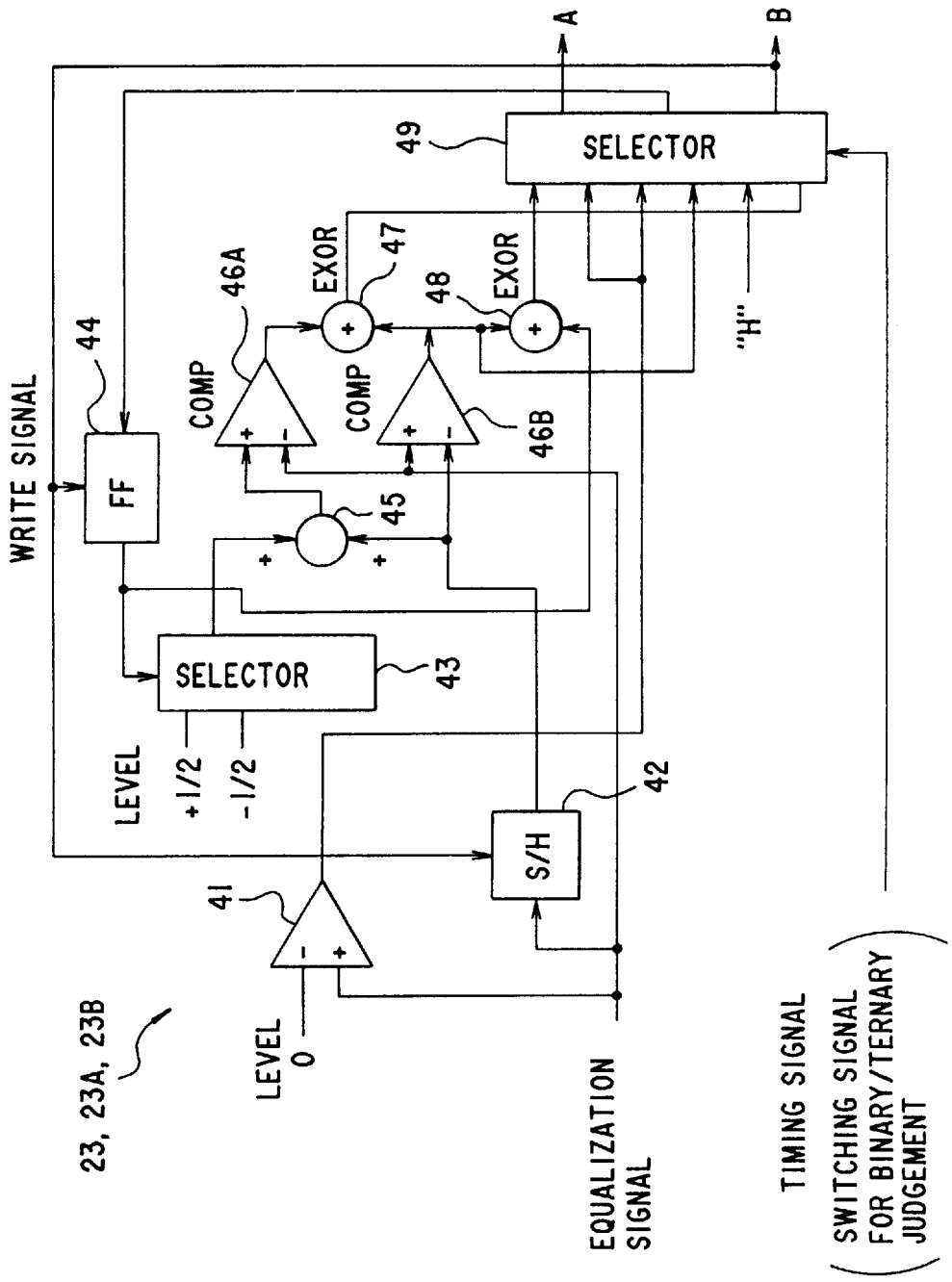
FIG. 4 is a block circuit diagram showing the construction of a binary/ternary judging portion of a maximum likelihood detection circuit with a binary/ternary judging circuit.
Figure 5A:
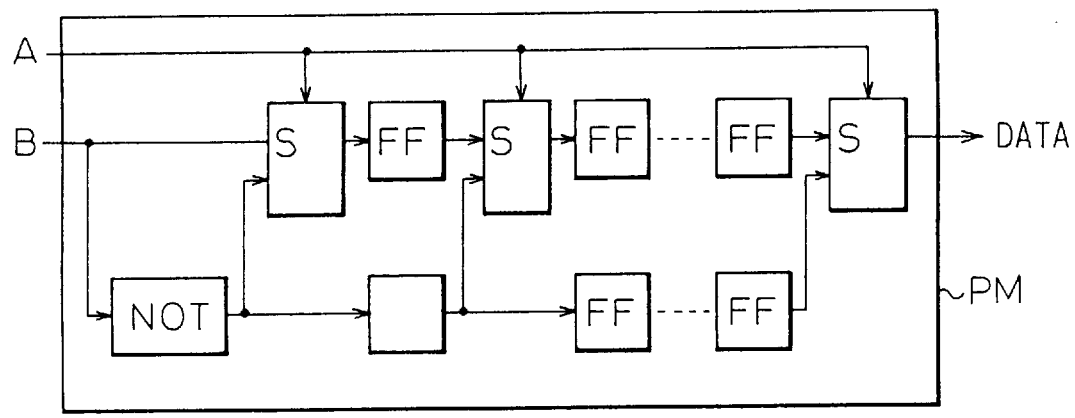
FIG. 5A is a diagram showing the construction of a path memory portion of the maximum likelihood detection circuit with the binary/ternary judging circuit shown in FIGS. 2A and 2B.

The binary/ternary judging portion of each maximum likelihood detection circuit 23, 23A, 23B with the binary/ternary judging circuit comprises a comparator (binary judging circuit) 41 to which a level 0 for binary judgement is set, a sample holder (S/H) 42 of the equalization signal, a selector 43 for ternary judgement, which switches a level −½ and a level +½, a flip-flop (FF) 44, an adder 45, comparators (COMP) 46A, 46B, exclusive-OR circuits (EXOR) 47, 48, and a selector 49 of an output signal, for example, as shown in FIG. 4. The timing signal functioning as a binary/ternary value judgement switching signal is inputted to the selector 49. FIG. 5A shows the construction of a path memory portion PM of each maximum likelihood detection circuit 23, 23A, 23B with the binary/ternary judging circuit. It comprises a logic inversion circuit (NOT), selector (S) and flip-flop (FF).

The maximum likelihood detection portion for ternary value judgement is described in FIG. 8 of the following reference:

Roger W. Wood et al., "Viterbi Detection of Class IV Partial Response on a Magnetic Recording Channel" (IEEE Tran. Communication, Vol. COM-34, No. 5, May 1986, pp. 454–461).

Figure 5B:
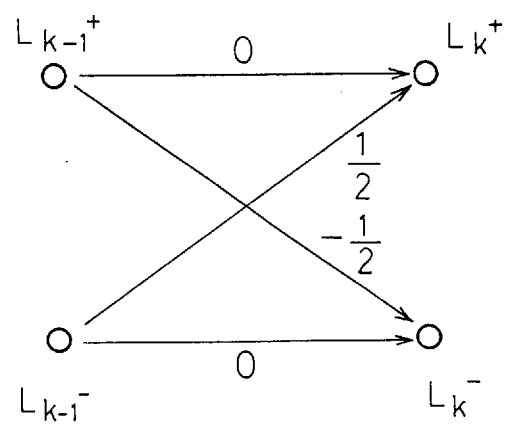
FIG. 5B is a state trellis diagram showing the shift of paths.

Here, the transitions of the paths are expressed by a state trellis diagram such as shown in FIG. 5B, and the maximum likelihood path judgement is effected by substituting the reproduced signal $Y_K$ for the following formula, comparing it with a metric and selecting a transition having a largest metric:

$$L_k^+ - L_k^- = \max\{L_{k-1}^+ + [-(y_k - 0)^2], L_{k-1}^- + [-(y_k - 1/2)^2]\} -$$
$$\max\{L_{k-1}^+ + [-(y_k + 1/2)^2], L_{k-1}^- + [-(y_k - 0)^2]\}$$
$$= L_{k-1}^+ - L_{k-1}^- +$$
$$\max\{1/4, y_k - (L_{k-1}^+ - L_{k-1}^-)\} -$$
$$\max\{-y_k + (L_{k-1}^+ - L_{k-1}^-), 1/4\}$$
$$\Delta L_k = \Delta L_{k-1} + \max\{1/4, y_k - \Delta L_{k-1}\} -$$
$$\max\{-y_k + (\Delta L_{k-1}, 1/4)\}$$

Here, the types of transition can be divided into the following three kinds:

(1) When path merge is made to $L_k^+$ side:

$$y_k > \Delta L_{k-1} + \frac{1}{4} \rightarrow \Delta L_k = y_k - \frac{1}{4}$$

(2) When no path merge exists:

$$\Delta L_{k-1} - \frac{1}{4} Y_k < \Delta L_{k-1} + \frac{1}{4}$$

(3) When path merge is made to $L_k^-$ side:

$$y_k < \Delta L_{k-1} - \frac{1}{4} \rightarrow L_k = y_{k+\frac{1}{4}}$$

The metric $L_{K-1}$ can be reproduced as follows by the reproduced signal $y_p$ at the time of the newest path merge:

$$\Delta L_{k-1} = y_p - p\frac{1}{4} \text{ or } y_p + \frac{1}{4}$$

In the maximum likelihood detection circuit shown in FIG. 4, $y_p$ is held by the sample holder 42 and the sign of its correction value (±¼) is held by the flip-flop 44 (– when "H" and + when "L").

The threshold value of the path judgement is as follows when the flip-flop 44 is "H":
$$\Delta L_{k-1} + \frac{1}{4} = y_p, \Delta L_{k-\frac{1}{4}} = y_p - \frac{1}{2}$$
When the flip-flop 44 is "L", the threshold value becomes as follows:
$$\Delta L_{k-1} + \frac{1}{4} = y_p + \frac{1}{2}, \Delta L_{k-1} \frac{1}{4} = y_p$$

In other words, the ½ and –½ levels are switched by the output of the flip-flop 44 and is added to the output $y_p$ of the sample holder 42, and one of the threshold values is thus obtained. Under the conditions (1) and (3) described above, the values of the sample holder 42 and the flip-flop 44 are updated by the write signal.

On the other hand, the following two kinds of transition is judged in the binary value judgement:

(a) When path merge is made to L+k side:

$$y_k > 0 \rightarrow y_p = y_k, \text{ "L" is held by flip-flop}$$

(b) When path merge is made to L-k side:

$$y_k < 0 \rightarrow y_p = y_k, \text{ "H"}$$

is held by flip-flop

Figure 6E:
Figure 6F:
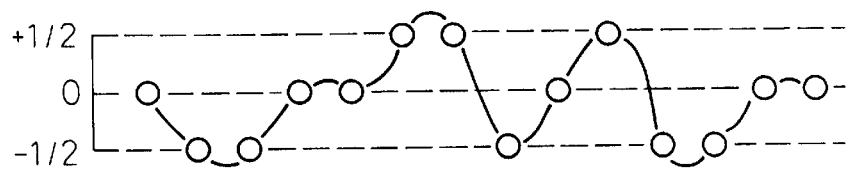
Figure 6G:
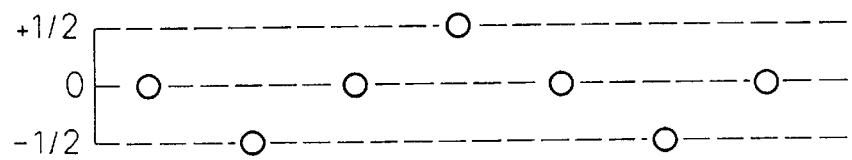

FIGS. 6A to 6G show the flow of the signal at each portion to the magnetic disk drives 10, 10' shown in FIGS. 2A, 2B. The explanation will be hereby given on the case where the data "10011011" as shown in FIG. 6A is inputted to the magnetic disk drives 10, 10' shown in FIGS. 2A, 2B. At this time, the signal after the dummy bit "1" is inserted in the dummy bit insertion circuit 11 becomes such as shown in FIG. 6B. The output of the precoder 12 shown in FIG. 2B after the dummy bit "1" is inserted into the dummy bit insertion circuit 11 at this time is shown in FIG. 6C, and a write current to the magnetic disk D is shown in FIG. 6D. An equalization waveform of the data read out from the disk D, on which the data are recorded, by the head 14 and passed through the equalizer 22 is shown in FIG. 6E. The waveforms of the odd-numbered sequence (FIG. 6F) and the even-numbered sequence (FIG. 6G) in the magnetic disk drive 10' shown in FIG. 2B are shown in FIGS. 6F and 6G.

Figure 7A:
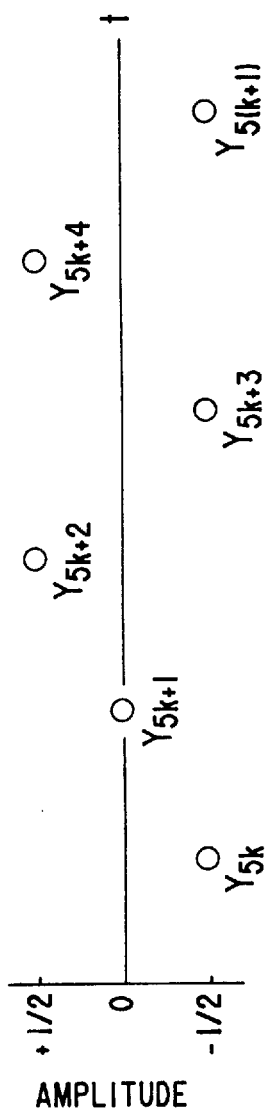
FIG. 7A shows an example of equalized signal when divided into an even-numbered sequence.
Figure 7B:
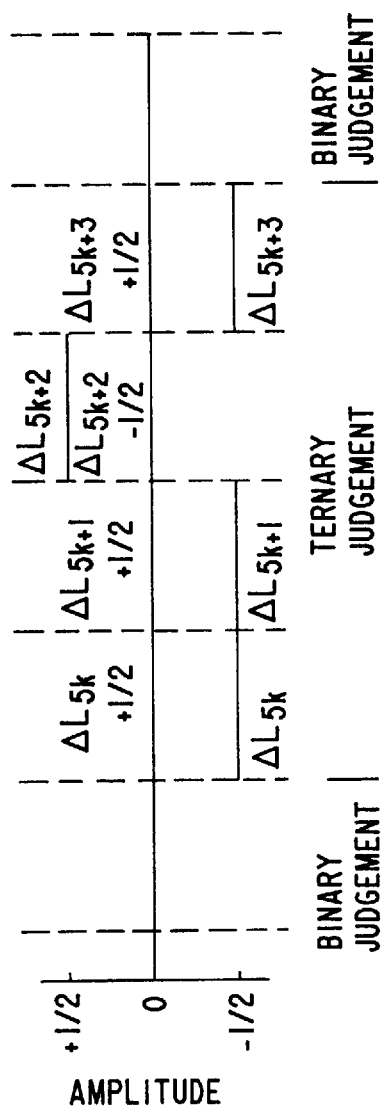
FIGS. 7B and 7C show the operation of a maximum likelihood detection portion of binary/ternary judgement.
Figure 7C:
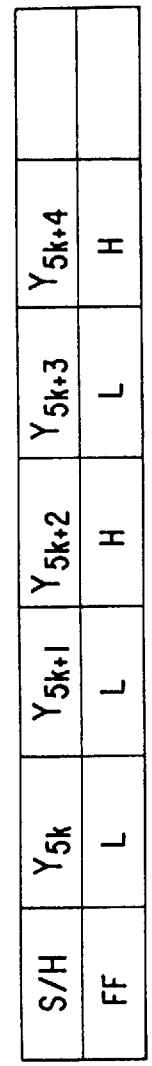

FIG. 7A shows an example of an equalized signal (corresponding to 1-D) when divided into the even-numbered sequence, and FIGS. 7B and 7C are diagrams showing the operation of the maximum likelihood detection portion for the binary/ternary value judgement. As shown in FIG. 7A, when the equalized signals $Y_{5k+1}$ to $Y_{5k+4}$ for four bits, which are encompassed by two dummy bits $Y_{5k}$ and $Y_{(k+1)}$, change, the level of the binary/ternary value judgement shown in FIG. 7B remains at 0 and constant at the positions of the dummy bits, but at other positions, two judgement levels $$\Delta L_{5k} \Delta L_{5k} + \frac{1}{2} \sim \Delta L_{5k} \Delta L_{5k+3} + \frac{1}{2}$$

become necessary as the judgement level of the ternary value. The levels of the two judgement levels $$\Delta L_{5k} \Delta L_{5k} + \frac{1}{2} \sim \Delta L_{5k+3} \Delta L_{5k+3} + \frac{1}{2}$$

change by the previous value of the equalized signal. FIG. 7C shows the outputs of the sample holder 42 and the flip-flop 44 shown in FIG. 4 when the equalized signal changes as shown in FIG. 7A.

Figures 8A, 8B:
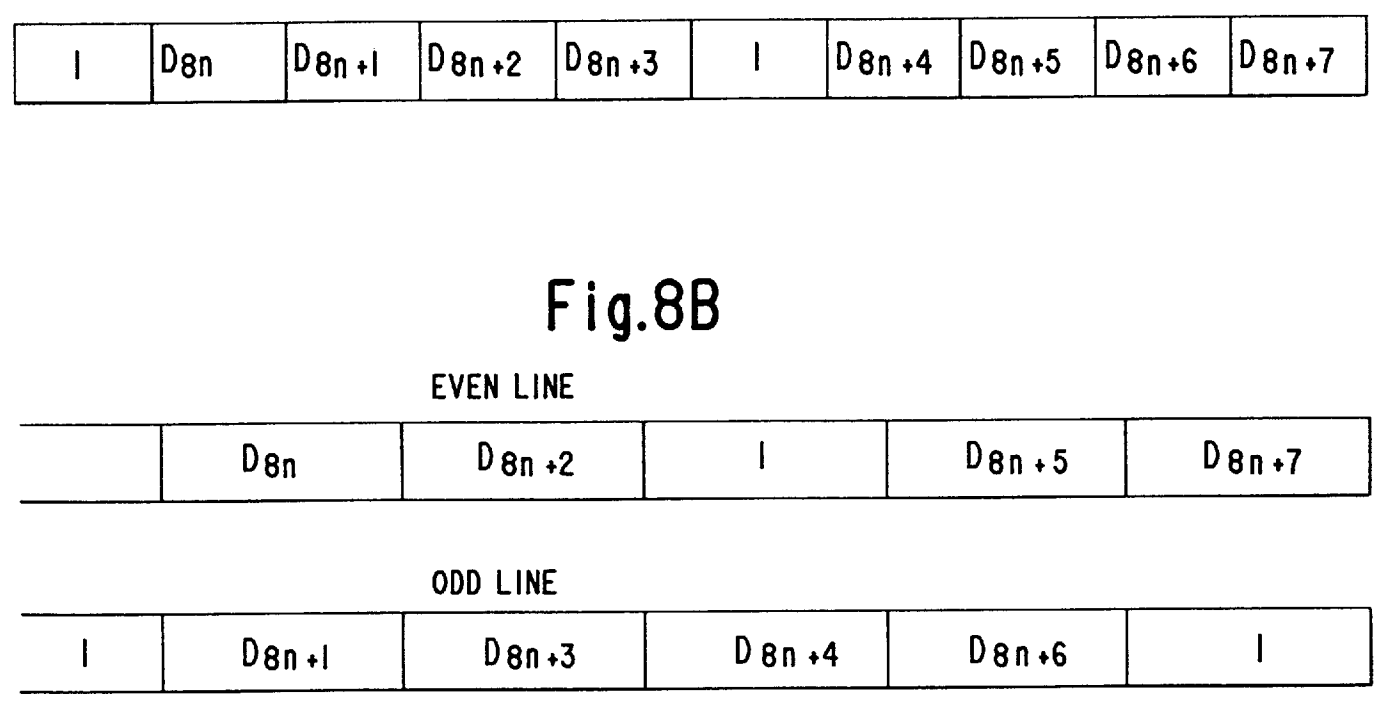

FIG. 8A explains the code sequence [equivalent to 4/5 (0, 4)] in partial-response after equalization, and FIG. 8B shows the code sequences [equivalent to 8/10 (0, 4, 4)] after distribution to the even-numbered sequence and the odd-numbered sequence in the partial-response class 4.

Further, FIG. 9A is a diagram useful for explaining the reproduced signal when distributed to a buffer, and FIG. 9B is a state trellis diagram of the reproduced signal into which the dummy bit is inserted. As can be understood from this state trellis diagram, merge of the paths is unconditionally effected at the position of the dummy bit, and the maximum likelihood judgement is effected at the position of the information bit.

The operation of the maximum likelihood detection portion for the binary/ternary value judgement will be explained with reference to the state trellis diagram of FIG. 9B. Symbols ① to ⑥ in FIG. 9B represent step numbers, respectively.

Binary value judgement is made at step 1. Since $y_{5k} < 0$, path merge is made to the $L_{5k}^-$ side, $y_{5\ k}$ is held by the sample holder 42 and "L" is set to the flip-flop 44.

Ternary value judgement is made at step 2. Since $y_p \leq y_{5k+1} \leq y$, path survivor is made, and no change takes place in the sample holder 42 and the flip-flop 44, either.

Ternary value judgement is made at step 3. Since $y_p$, $+\frac{1}{2} \leq y_{k+2}$, path merge is made to the $L^+_{5k+2}$ side, $y_{5k+2}$ is held by the sample holder 42 and "H" is set to the flip-flop 44.

Ternary value judgement is made at step 4. Since $y_{5k+3} << y$, $-\frac{1}{2}$, path merge is made to the $L^-_{5\ k+3}$ side, $y_{5k+3}$ is held by the sample holder 42, and "L" is set to the flip-flop 44.

Ternary value judgement is made at step 5. Since $y$, $+\frac{1}{2} \leq y_{5k+4}$, path merge is made to the $L^+_{5k+4}$ side, $y_{5k+4}$ is held by the sample holder 42, and "H" is set to the flip-flop 44.

Binary value judgement is made at step 6. Since $y_{5(k+1)} < 0$, path merge is made to the $L^-_{5(k+1)}$ side, $y_{5(k+1)}$ is held by the sample holder 42, and "L" is set to the flip-flop 4.

Figure 10A:
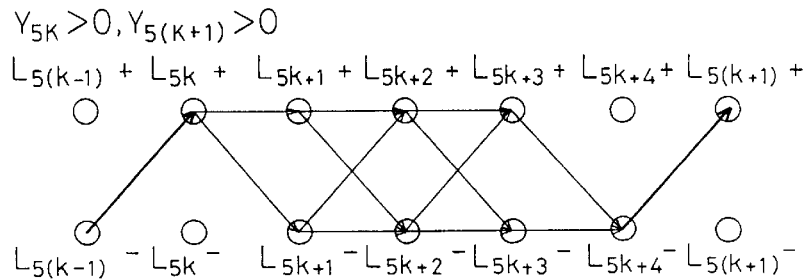
Figure 10B:
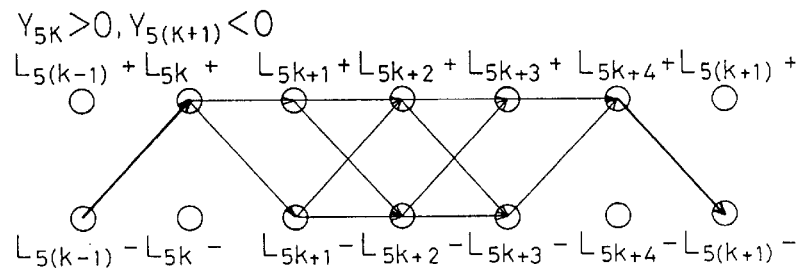
Figure 10C:
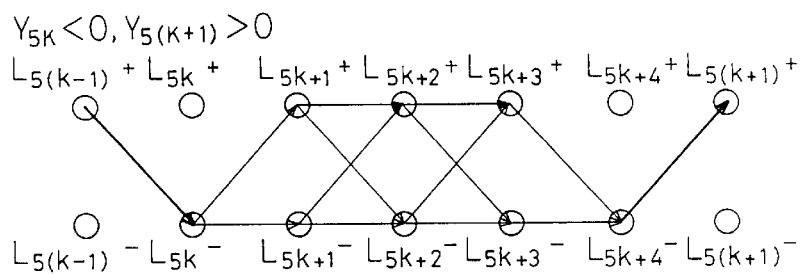
Figure 10D:
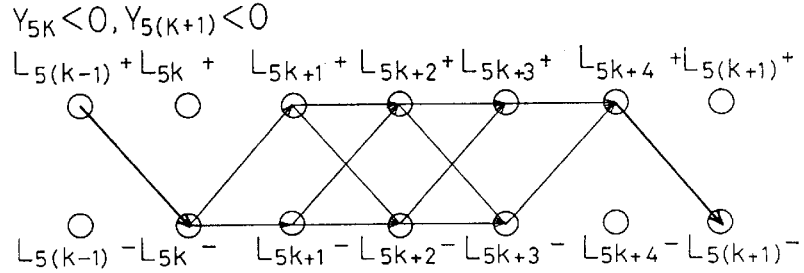

FIGS. 10A to 10D are state trellis diagrams when judgement is made by the dummy bit. When the value of the dummy bit $Y_{5\ k}$ is positive, the state trellis diagram changes as shown in FIG. 10A when the value of the next bit $Y_{5(k+1)}$ is positive, and changes as shown in FIG. 10B when the value of the next dummy bit $Y_{5(k+1)}$ is negative. Similarly, when the value of the dummy bit $Y_{5k}$ is negative, the state trellis diagram changes as shown in FIG. 10C when the value of the next dummy bit $Y_{5(k+1)}$ is positive and changes as shown in FIG. 10D when the value of the next dummy bit $Y_{5(k+1)}$ is negative.

The limit code of consecutive 0s generated by the dummy bit insertion circuit 11 according to the present invention becomes $$n/(n+1)*(0, n) \text{ code}$$

which becomes the shortest at 0 and becomes the longest at n in a single sequence when the length of the information bit is n bit(s). The number of information bits converted is limited to the multiple of n for a recording system wherein, when the signal after equalization is separated into the odd-numbered and even-numbered sequences, the signal becomes a code sequence of 1-D, such as the partial-response class 4. The resulting code becomes $$2n/2(n+1)*(0,n,n) \text{ code}$$

in which consecutive 0s are limited to n, at the most, for both the odd-numbered and even-numbered sequences.

Since the dummy bit is not inserted into the information, the information is as such outputted in the code, and a bit error is not propagated in code conversion on the reproduction side. The data portion of the reproduced signal is discriminated in the dummy bit synchronous circuit 25, and a counter is synchronized with the position of the dummy bit. The reproduced signal is equalized and distributed, and is converted to the 1-D code train. Since the code train is divided by the dummy bits "1", it is not affected by the interference of 1-D.

Accordingly, the code train equalized and distributed to 1-D can be independently subjected to maximum likelihood detection. Maximum likelihood detection is switched to the binary value judgement at the timing generated from the counter of the dummy bit synchronous circuit 25, by utilizing the fact that the dummy bit "1" is the junction point of the paths. In the signal after equalization and distribution of the dummy bit, its normal value (expected value, judgment value) becomes $-\frac{1}{2}$ or $+\frac{1}{2}$. Accordingly, the frequency of erroneous detection can be restricted by effecting binary value judgment having a judgement level of 0. When the dummy bit "1" corresponds to the start point of the path, the path metric is initialized at the initial value ($-\frac{1}{2}$ or $+\frac{1}{2}$).

On the other hand, when the dummy bit corresponds to the end point of the path, the most likely condition is detected, and the output of the result of maximum likelihood detection of the previous code and initialization of the path metric of the next code are simultaneously carried out at the position of the dummy bit.

Since the paths are connected by the dummy bits "1", maximum likelihood detection can be made for each code string corresponding to the information bit string interposed by the dummy bits. Accordingly, maximum likelihood detection can be made in parallel by extracting the code string interposed by the dummy bits at the timing generated from the synchronous counter of the dummy bit synchronous circuit 25, and the operating speed of maximum likelihood detection can be improved. The reproduced information bit can be obtained by merely removing the dummy bit from the output of the maximum likelihood detection by the dummy bit removable circuit 24. Accordingly, propagation of the bit error in the code conversion, which has occurred in the conventional apparatus, does not occur.

Next, another embodiment of the present invention will be explained.

Figure 11:
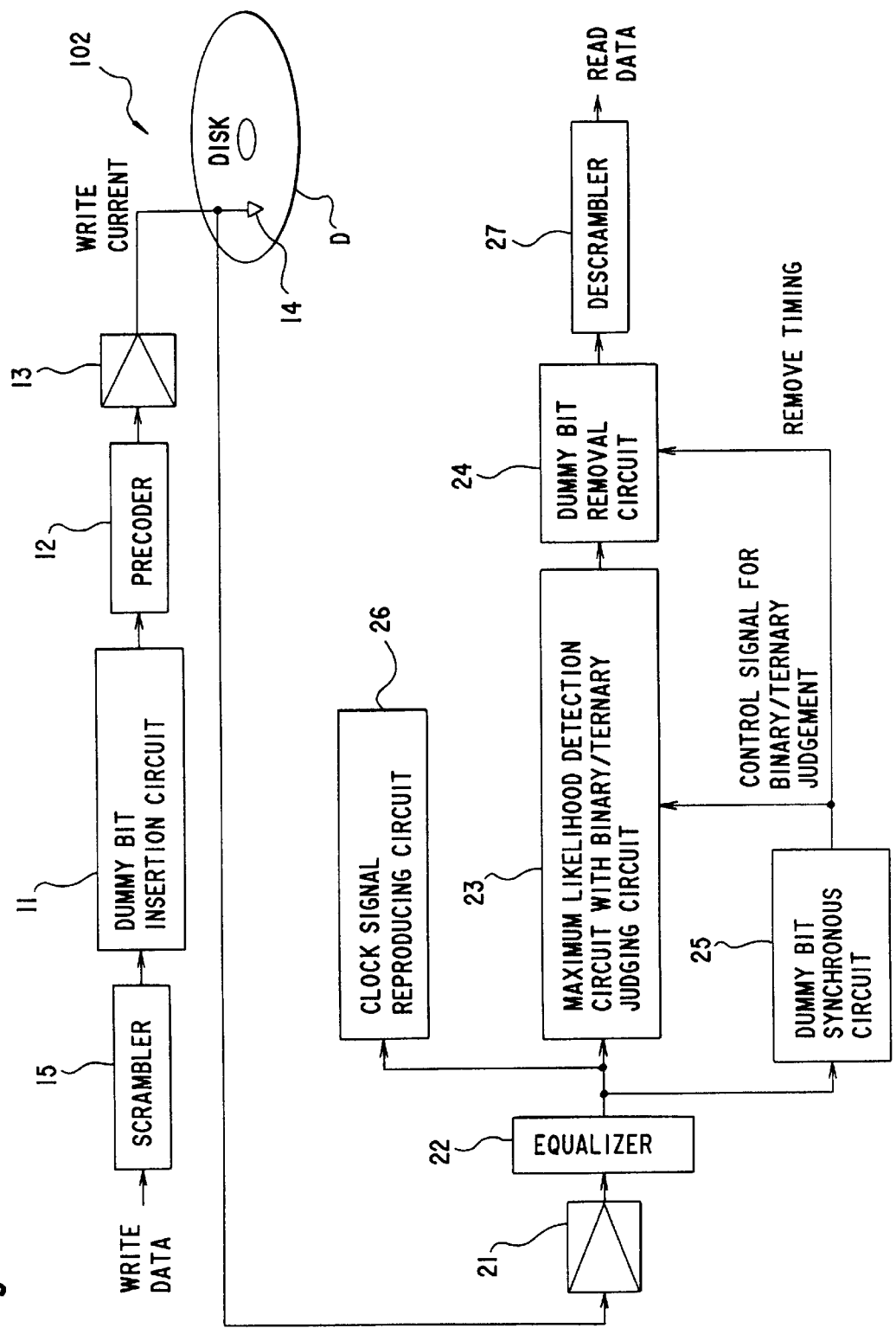
FIG. 11 is a block circuit diagram showing the construction of a magnetic disk drive according to the second embodiment of the present invention.

FIG. 11 is a block circuit diagram showing the construction of the magnetic disk drive 102 in the second embodiment of the present invention, and the same reference numerals are used to identify the same constituents as in the first embodiment. The difference between the magnetic disk drive 102 shown in FIG. 11 and the magnetic disk drive 10 shown in FIG. 2A is in that a scrambler 15 is disposed as a pre-stage of the dummy bit insertion circuit 11 and a descrambler 27 is disposed as a post-stage of the dummy bit removal circuit 24. In the embodiment shown in FIG. 2A, the information bit is as such outputted as the code, but in this embodiment, the data of the information bit is ciphered by the scrambler 15, and the read data from the dummy bit removal circuit 24 is decoded by the descrambler 27.

The scrambler 15 and the descrambler 27 reduce the possibility of a hang-up, and make reproduction of the clock signal reliable.

Figure 12:
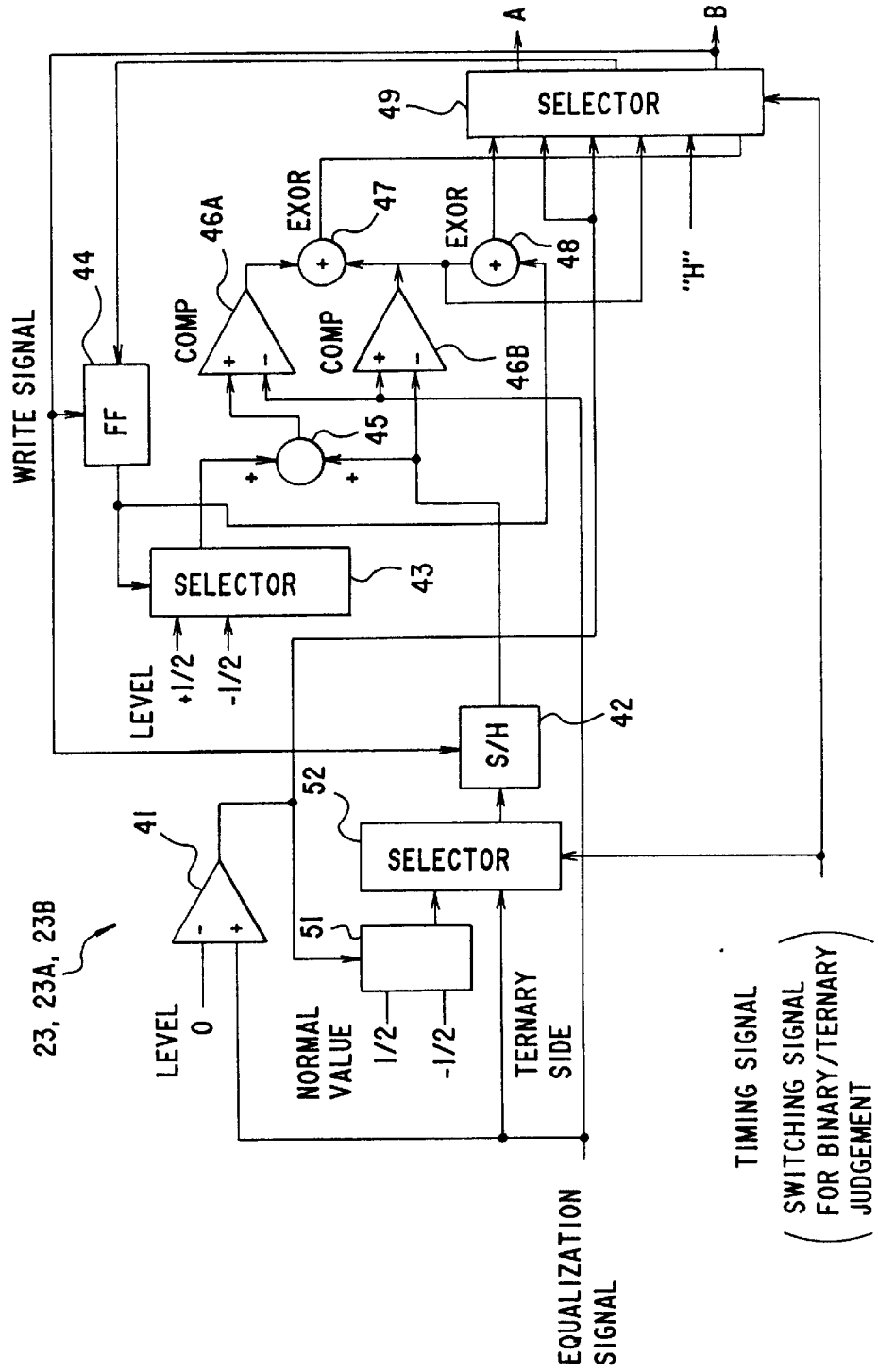
FIG. 12 is a block circuit diagram showing the construction of the maximum likelihood detection circuit with binary/ternary judging circuit according to the third embodiment of the present invention.

FIG. 12 is a block circuit diagram showing the construction of the maximum likelihood detection circuit 23 with the binary/ternary value judging circuit in the third embodiment of the present invention. In the foregoing embodiments, the path metric is initialized by the reproduced signal by the binary judgement, but in this embodiment, initialization is made by the normal value. Accordingly, besides the construction of the maximum likelihood detection circuits 23, 23A, 23B with the binary/ternary judging circuit shown in FIG. 4, the circuit of the this embodiment includes a normal value setting circuit 51 and a selector 52 for the normal value and the equalized signal that are disposed as a pre-stage of the sample hold circuit 42. The circuit of this embodiment is different only in this point from the foregoing embodiment.

When the path metric is initialized in this way by the normal value, noise contained in the equalized signal can be removed.

Figure 13:
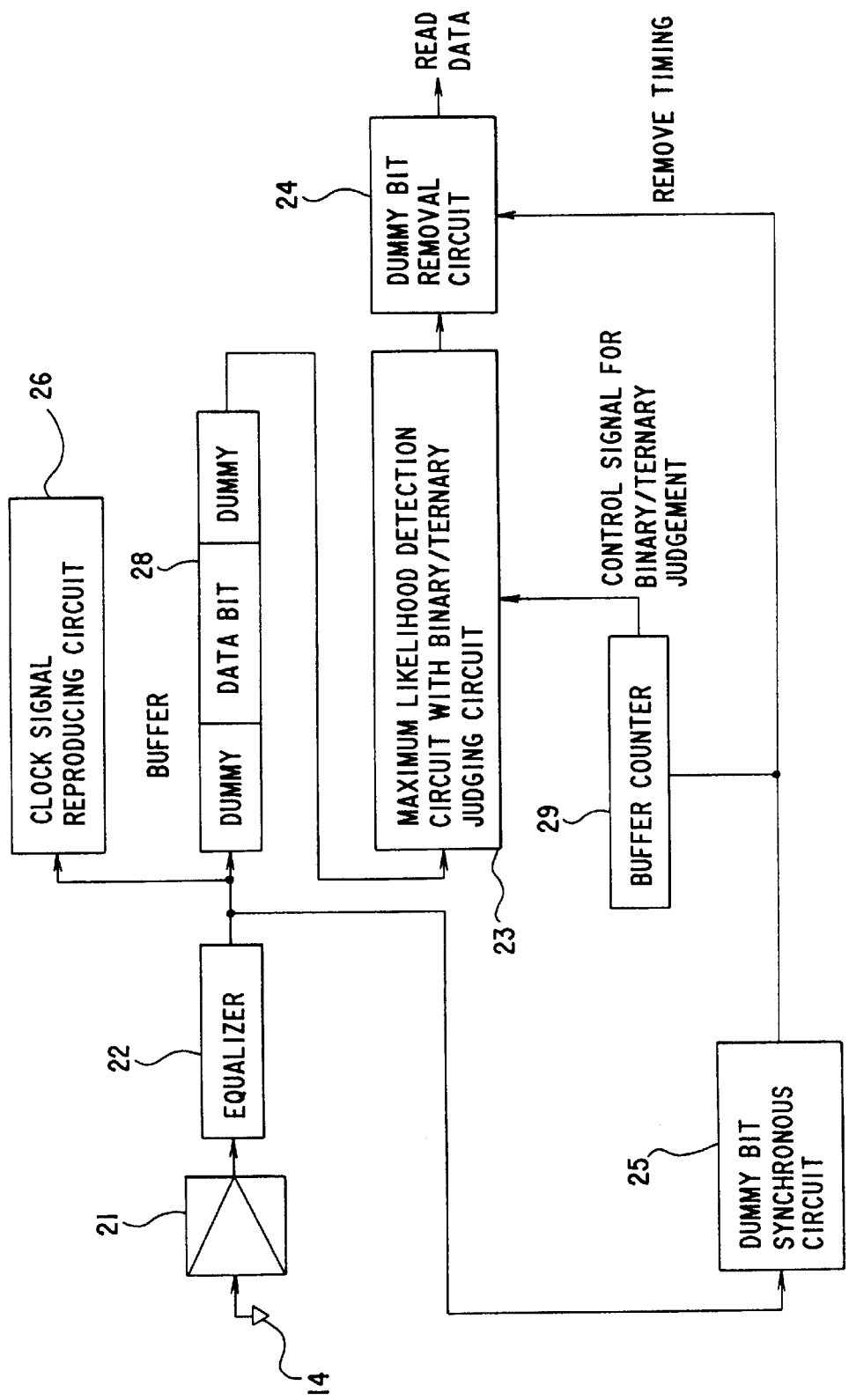
FIG. 13 is a block circuit diagram showing the construction of the magnetic disk drive according to the fourth embodiment of the present invention.

FIG. 13 is a block circuit diagram showing the construction of the magnetic disk drive 104 according to the fourth embodiment of the present invention. The drawing shows only a reproducing system from the magnetic disk. The differences between this magnetic disk drive 104 and the magnetic disk drive 10 shown in FIG. 2A are that a buffer 28 for extracting the code string interposed by the dummy bits is disposed between the equalizer 22 and the maximum likelihood detection circuit 23 with the binary/ternary judging circuit and that a buffer counter 29 is disposed between the dummy bit synchronous circuit 25 and the maximum likelihood detection circuit 23 with the binary/ternary detecting circuit.

In the embodiment shown in FIG. 2A, maximum likelihood detection is sequentially carried out. In this embodiment, on the other hand, the reproduced signal is taken into the buffer 28 by the distributor for separating the equalized signal into the 1-D symbol string and the buffer 28 for extracting the code string interposed by the dummy bits, the path is initialized by the signal of the first stage of the buffer, retrieval is thus started, and the most likely path in the maximum likelihood detection is determined by the signal of the last stage. In other words, binary/ternary judgement is made by parallel processing. As a result, maximum likelihood detection can be carried out at a high speed.

Figure 14:
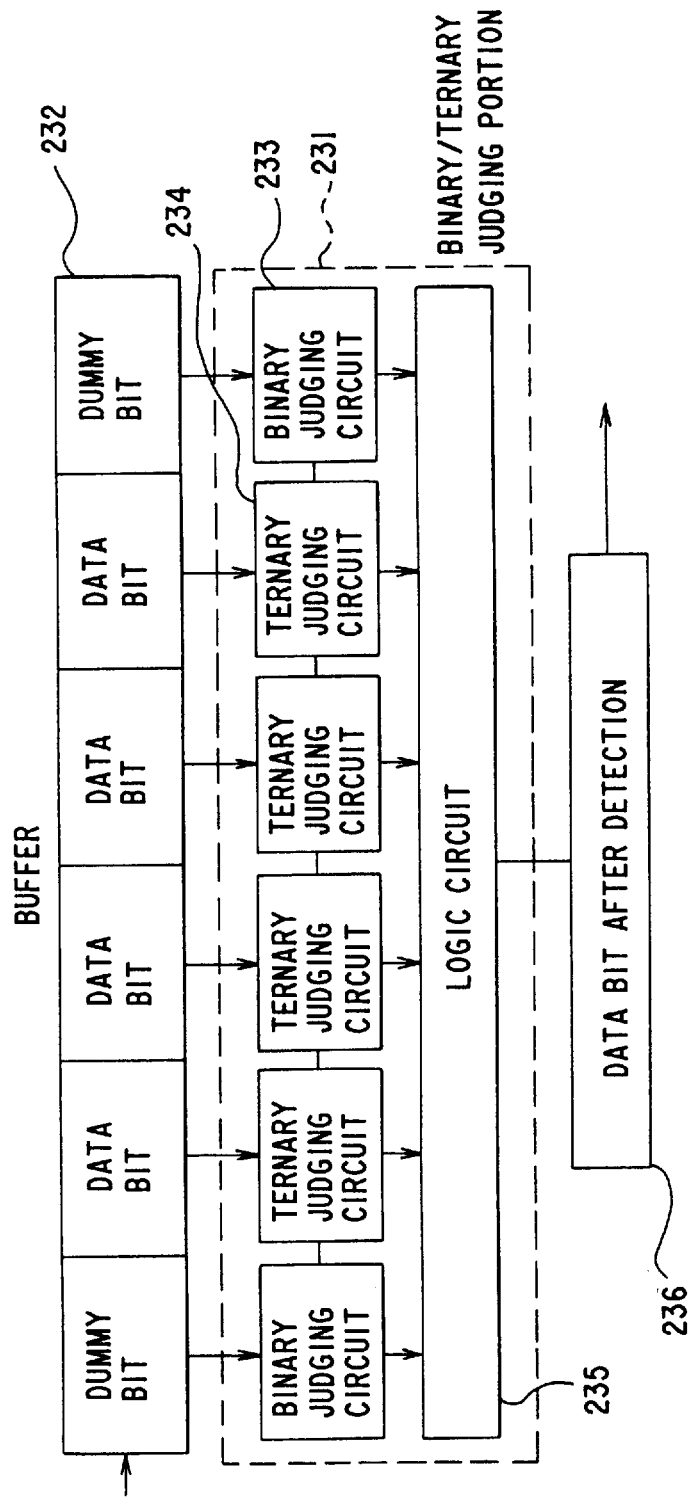
FIG. 14 explains the construction of the binary/ternary judgement portion of the magnetic disk drive according to the fifth embodiment of the present invention.

FIG. 14 shows the fifth embodiment of the present invention, and is useful for explaining the construction of the maximum likelihood detection circuit 23 with the binary/ternary judging circuit in the magnetic disk drive. In this embodiment, a buffer 232 for storing the dummy bits and the information bits is disposed at a pre-stage of the binary/ternary judging portion 231 of the maximum likelihood detection circuit 23 with the binary/ternary detecting circuit, and a binary judging circuit 233 and a ternary judging circuit 234 are so disposed in the binary/ternary judging portion 231 as to correspond to the individual bits of this buffer 232, respectively. The judgement results of the binary judging circuit 233 and the ternary judging circuit 234 are inputted to a logic circuit 235 so that the overall result can be judged, and the information bits after detection are stored in the buffer 236 and are then outputted.

In the foregoing embodiments, the maximum likelihood detection is carried out by switching the binary/ternary judgement, but in this embodiment, the binary judging circuit and the ternary judging circuit and individually prepared, so that binary judgement and ternary judgement are executed at a time. As a result, the maximum likelihood detection can be carried out at a high speed.

Figure 15:
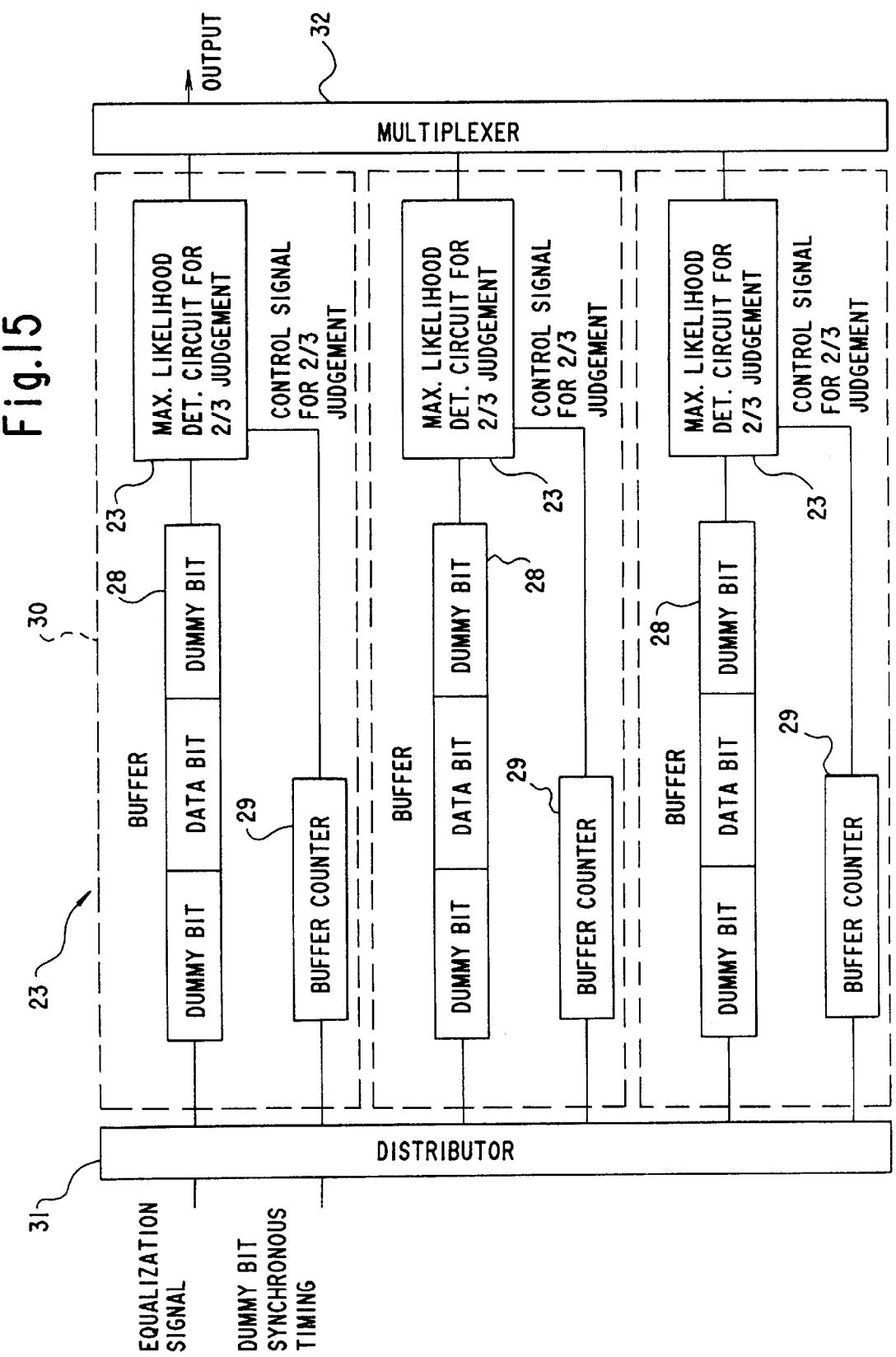
FIG. 15 is a block circuit diagram showing the construction of the binary/ternary judgement portion of the magnetic disk drive according to the sixth embodiment of the present invention.

FIG. 15 shows the sixth embodiment of the present invention, and is useful for explaining the construction of the maximum likelihood detection circuit 23 with the binary/ternary judging circuit in the magnetic disk drive. In this embodiment, a plurality of maximum likelihood detection portions with binary/ternary judging circuits, each of which includes the buffer 28 and the buffer counter 29 that are explained with reference to FIG. 13, are disposed. A distributor 31 is disposed at a pre-stage of a plurality of these maximum likelihood detection portions 30 and an adder 32 is disposed at a post-stage of these detection portions 30. The equalized signal and the dummy bit synchronous timing are inputted to the distributor, and a detection output is outputted from the multiplexer 32.

In the fourth embodiment explained with reference to FIG. 13, the signal of the buffer 28 extracting the code string is merely subjected to maximum likelihood detection. In this embodiment, on the other hand, the number of sets of the maximum likelihood detection portions 30 each including the buffer 28 and the maximum likelihood detection circuit 23 with the binary/ternary judging circuit is increased, and parallel processing is carried out. As a result, the processing speed can be improved.

Figure 16:
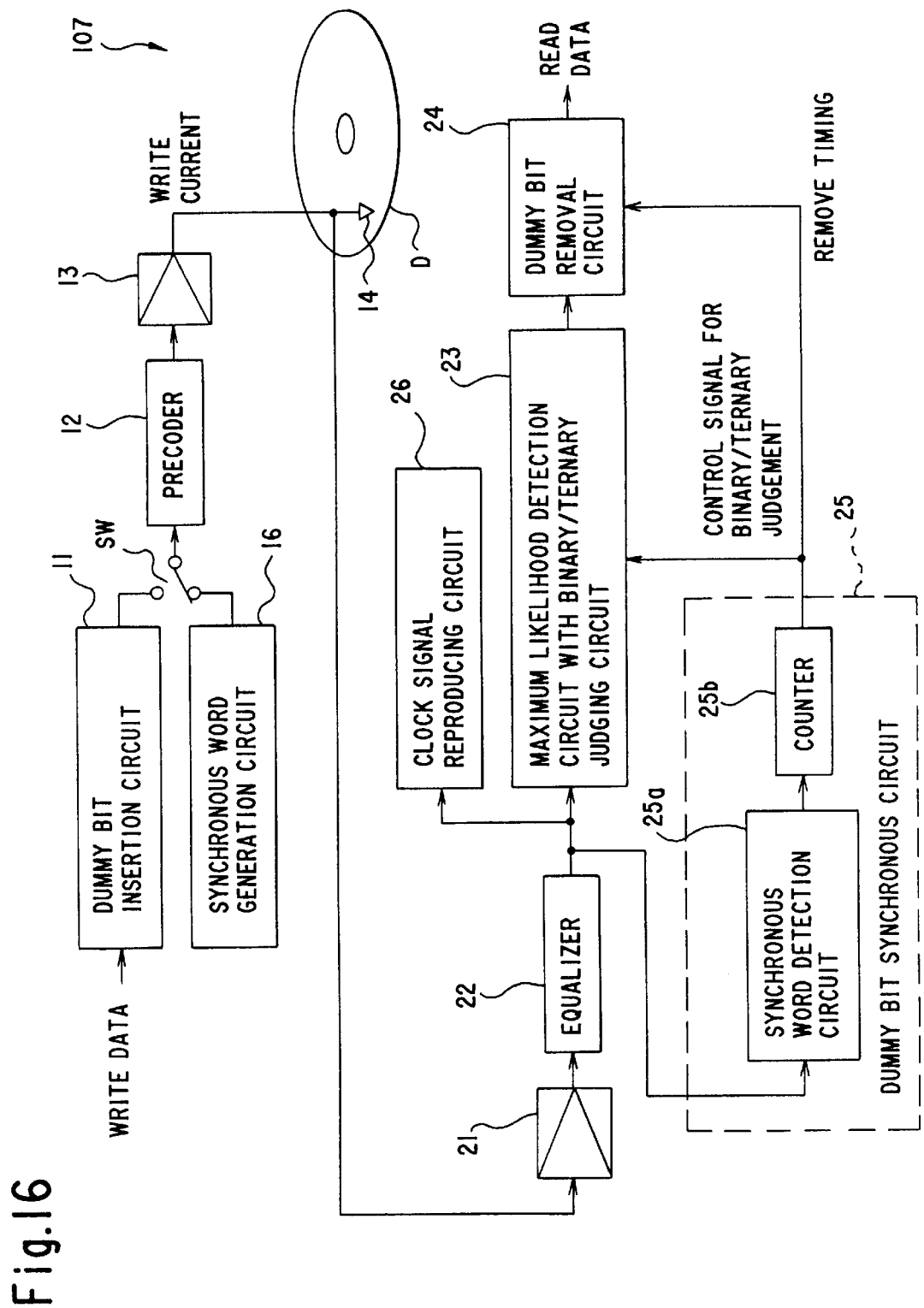
FIG. 16 is a block circuit diagram showing the construction of the magnetic disk drive according to the seventh embodiment of the present invention.

FIG. 16 is a block circuit diagram showing the construction of the magnetic disk drive 107 in the seventh embodiment of the present invention. In this embodiment, too, the same reference numerals are used to identify the same constituents as in FIG. 2A, and their explanation will be omitted. This embodiment is different from the magnetic disk drive 10 shown in FIG. 2A in that a dummy bit insertion circuit 11 and asynchronous word detection circuit 16 are so connected to the pre-stage of the precoder 12 as to be capable of switching, and that a synchronous work detection circuit 25a and a counter 25b are disposed inside the dummy bit synchronous circuit 25.

In the embodiment shown in FIG. 2A, dummy bit synchronization is attained at the timing of switching from the gap signal to the data, but in this embodiment, a synchronous word is added by a synchronous word generation circuit 16, and the counter 25b is reset by the synchronous signal that detects the synchronous word so as to attain dummy bit synchronization. As a result, the timing of the timing signal becomes reliable.

Figure 17:
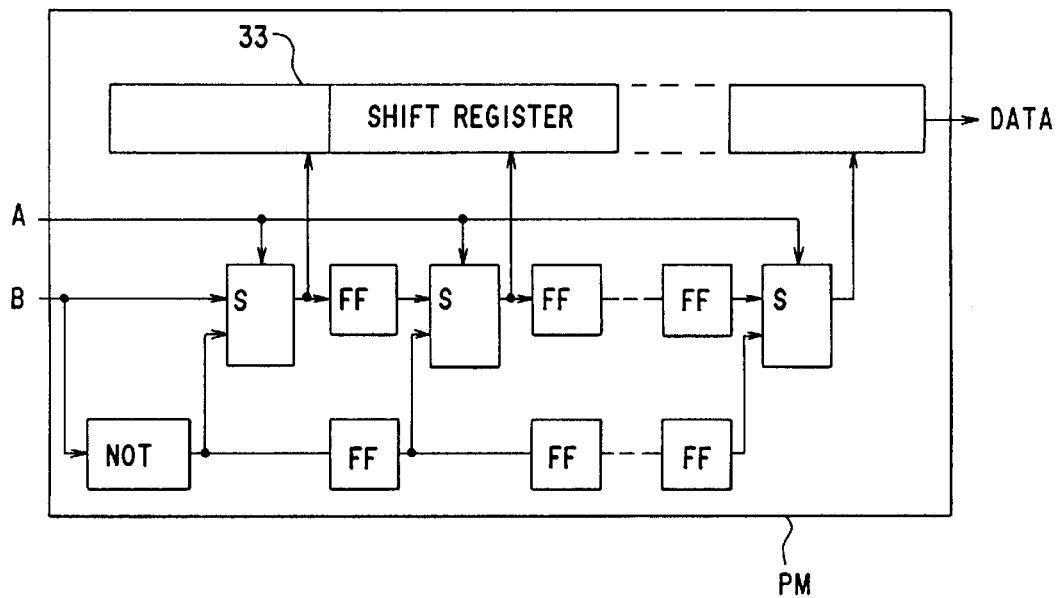
FIG. 17 is a block circuit diagram showing the construction of the binary/ternary judgement portion of the magnetic disk drive according to the eighth embodiment of the present invention.

FIG. 17 shows the eighth embodiment of the present invention, and is a block circuit diagram showing another construction of the binary/ternary judging portion of the path memory portion PM explained with reference to FIG. 5A. This embodiment is different in that a shift register 33 is disposed in addition to the circuit shown in FIG. 5A. In the embodiment shown in FIG. 5A, the judgement results are sequentially outputted from the path memory by the maximum likelihood detection circuit, and the result of judgment of the dummy bits, too, remains in the path memory. In this embodiment, however, only the information bits are loaded in parallel from the path memory into the register 33, and the dummy bits are removed. As a result, the size of the dummy bit removal circuit can be reduced, and the operating speed can be increased.

Figure 18:
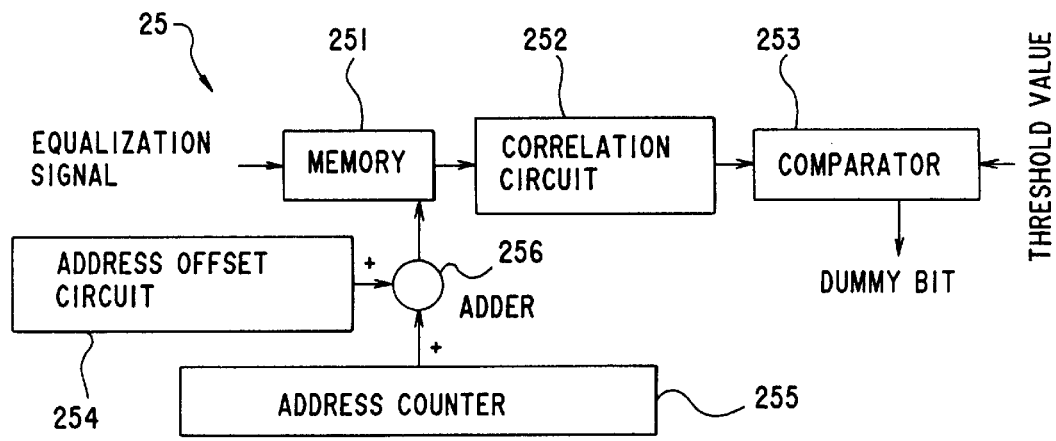
FIG. 18 is a block circuit diagram showing the construction of a dummy bit synchronous circuit of the magnetic disk drive according to the ninth embodiment of the present invention.

FIG. 18 shows the ninth embodiment of the present invention, an is a block circuit diagram showing the construction of the dummy bit synchronous circuit 25 of the magnetic disk drive. In this embodiment, the dummy bit synchronous circuit 25 comprises a memory 251, a correlation circuit, a comparator 253, an address offset circuit 254, an address counter 255 for a dummy bit cycle, and an adder 256.

In the foregoing embodiments, dummy bit synchronization is established before the data portion, but in this embodiment, the code string is read out from the memory 251 storing the data portion for each interval of the dummy bits and its correlation is examined by the correlation circuit 252. The dummy bit position is defined at the portion where correlation is strong, and then maximum likelihood detection is carried out. Incidentally, since there is the possibility that the dummy signal is judged as 0 due to the noise, a threshold value is inputted to the comparator 253 and the insertion of the dummy bit is judged as being inserted above a certain correlation.

Figure 19:
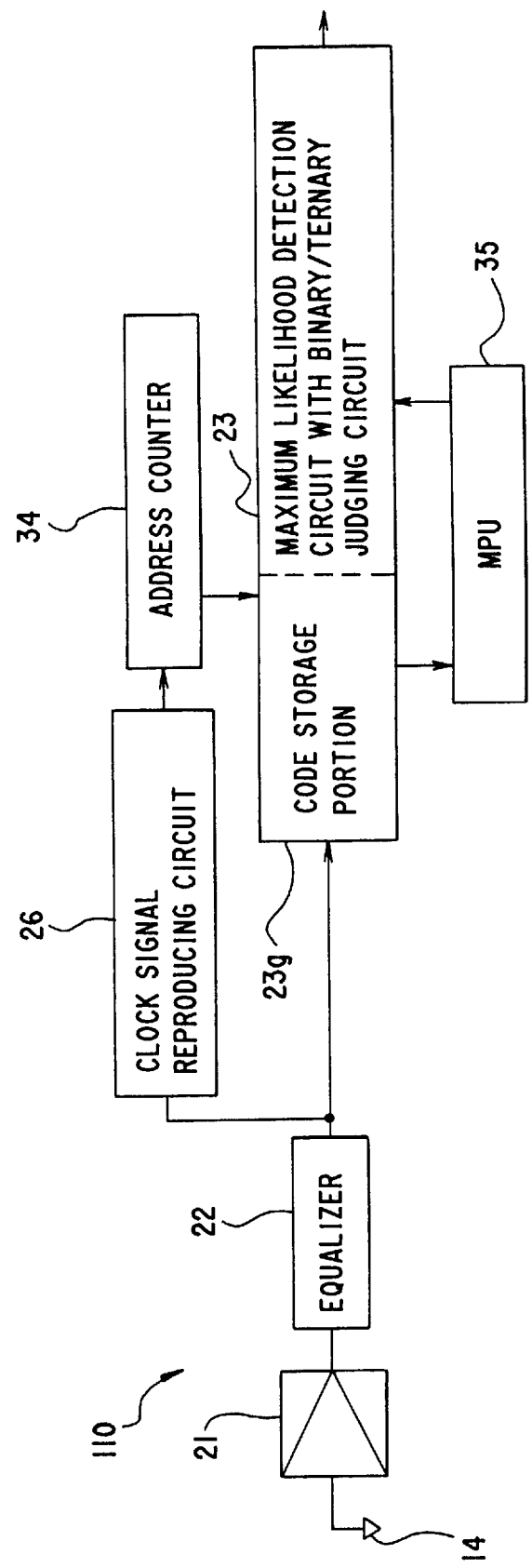
FIG. 19 is a block diagram showing the construction of the binary/ternary judgement portion of the magnetic disk drive according to the tenth embodiment of the present invention.

FIG. 19 is a block diagram showing the construction of the reproduction side of the magnetic disk drive in the tenth embodiment of the present invention, and the same reference numerals are used to identify the same constituent as in FIG. 2A. In this embodiment, an address counter 34 is disposed at the output end of the clock signal reproducing circuit 26, and a code storage portion 23g is disposed in the maximum likelihood detection circuit 23 with the binary/ternary judging circuit. This maximum likelihood detection circuit 23 is connected to a microprocessor (MPU) 35 as a control circuit.

In the foregoing embodiments, the dummy bit synchronous circuit 25 and the maximum likelihood detection circuit 23 with the binary/ternary judging circuit are constituted by hardware and maximum likelihood detection is effected, but in this embodiment, the code string after equalization is saved in the code storage portion 23g (memory) and the maximum likelihood detection processing is executed by software using the MPU 35.

Figure 20:
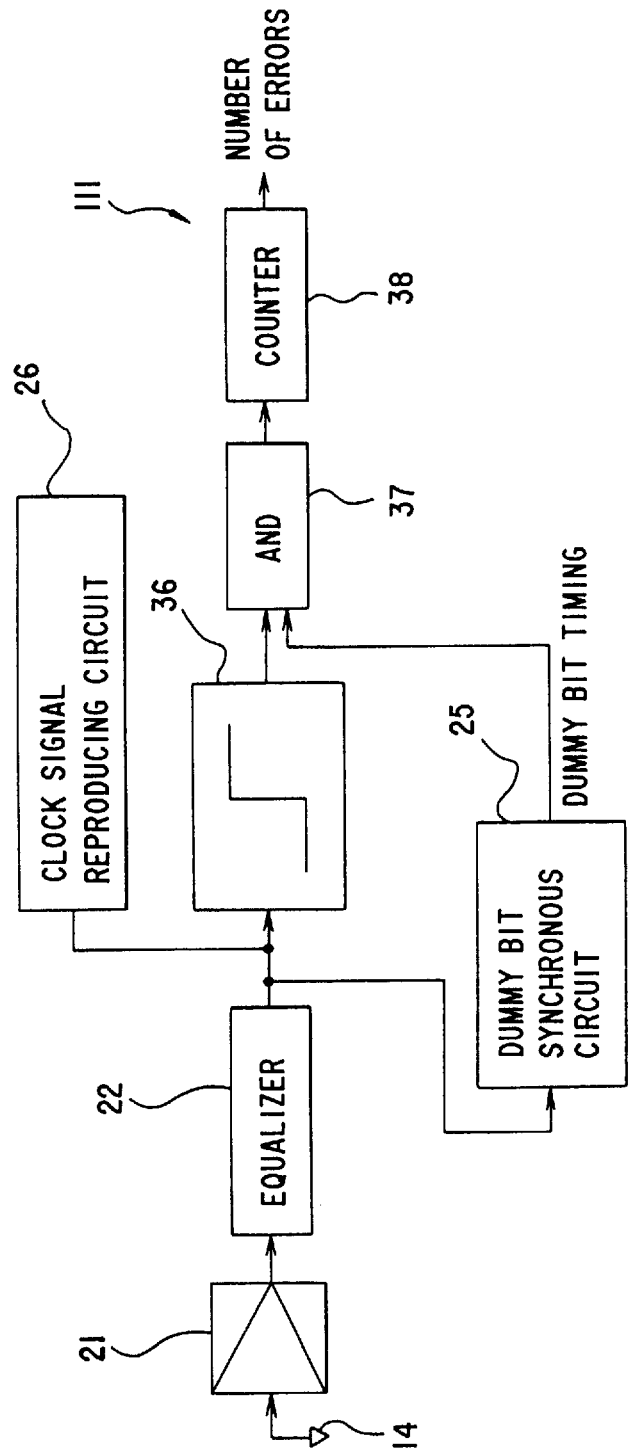
FIG. 20 is a block circuit diagram showing the construction wherein an error rate measuring circuit is added on the reproducing side of the magnetic disk drive according to the eleventh embodiment of the present invention.

FIG. 20 is a block diagram showing the construction of the reproduction side of the magnetic disk drive 111 in the eleventh embodiment of the present invention, and the same reference numerals are used to identify the same constituents as in FIG. 2A. In this embodiment, a binary judging circuit 36 and an AND circuit 37, that are for judging only the dummy bits, and a counter 38 for counting the number of zero judgement, are disposed on the reproduction side of the magnetic disk drive 111. This binary judging circuit 36 is the circuit which folds back the signal at 0, slices it at a ¼ level and demodulates the signal, and this is the simplest demodulation method not using maximum likelihood detection.

Although the foregoing embodiments do not estimate the error rate of the equalized signal, this embodiment can measure the error rate after equalization by the binary judging circuit 36 for judging only the dummy bits and the counter 38 for counting the number of zero judgements.

Figure 21:
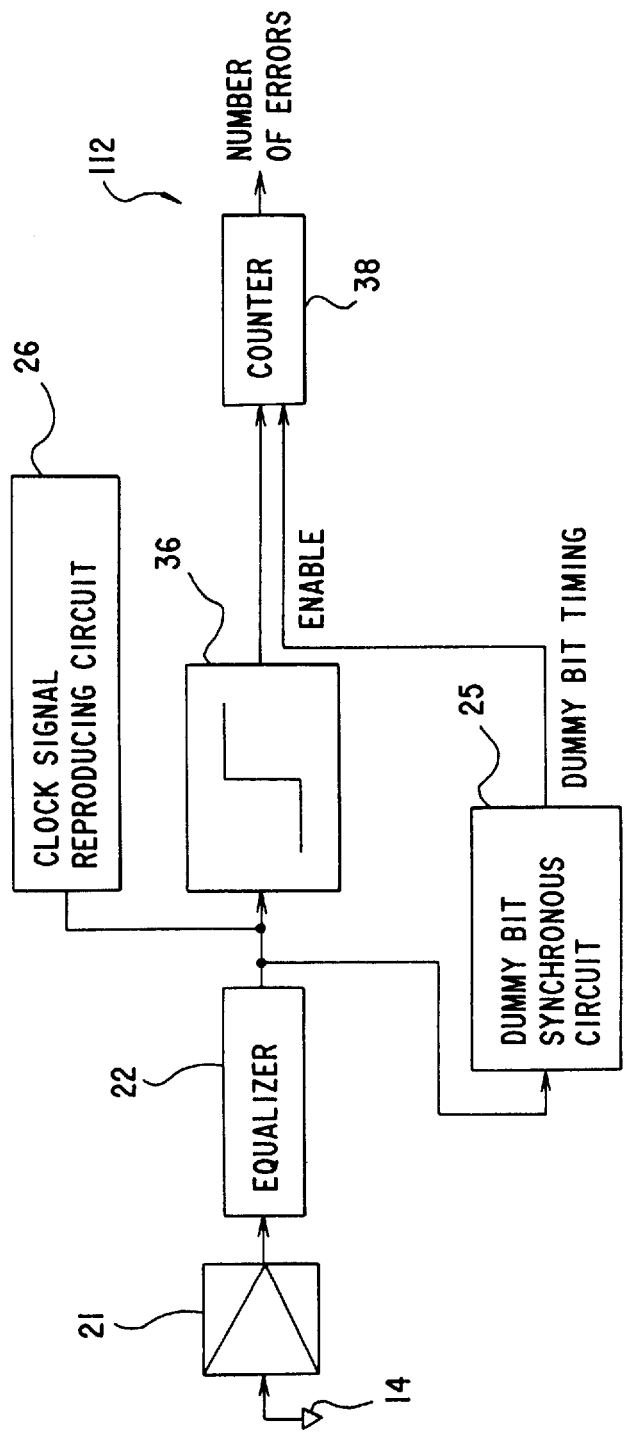
FIG. 21 is a block circuit diagram showing another construction wherein the error ratio measuring circuit is added on the reproducing side of the magnetic disk drive according to the twelfth embodiment of the present invention.

FIG. 21 is a block circuit diagram showing another construction wherein an error rate measuring circuit is added on the reproduction side of the magnetic disk drive 112 according to the twelfth embodiment of the present invention. This embodiment is different in that the AND circuit 37 is removed from the construction of the embodiment shown in FIG. 20 and an enable terminal is provided to the counter 38.

In the embodiment shown in FIG. 20, the binary judging circuit 36 is operated for only the dummy bits but in this embodiment, the binary judging circuit 36 always operates, and the counter 38 for counting the number of zero judgement is brought into Enable at the position of the dummy bit. In this way, the error rate after equalization is measured.

Figure 22:
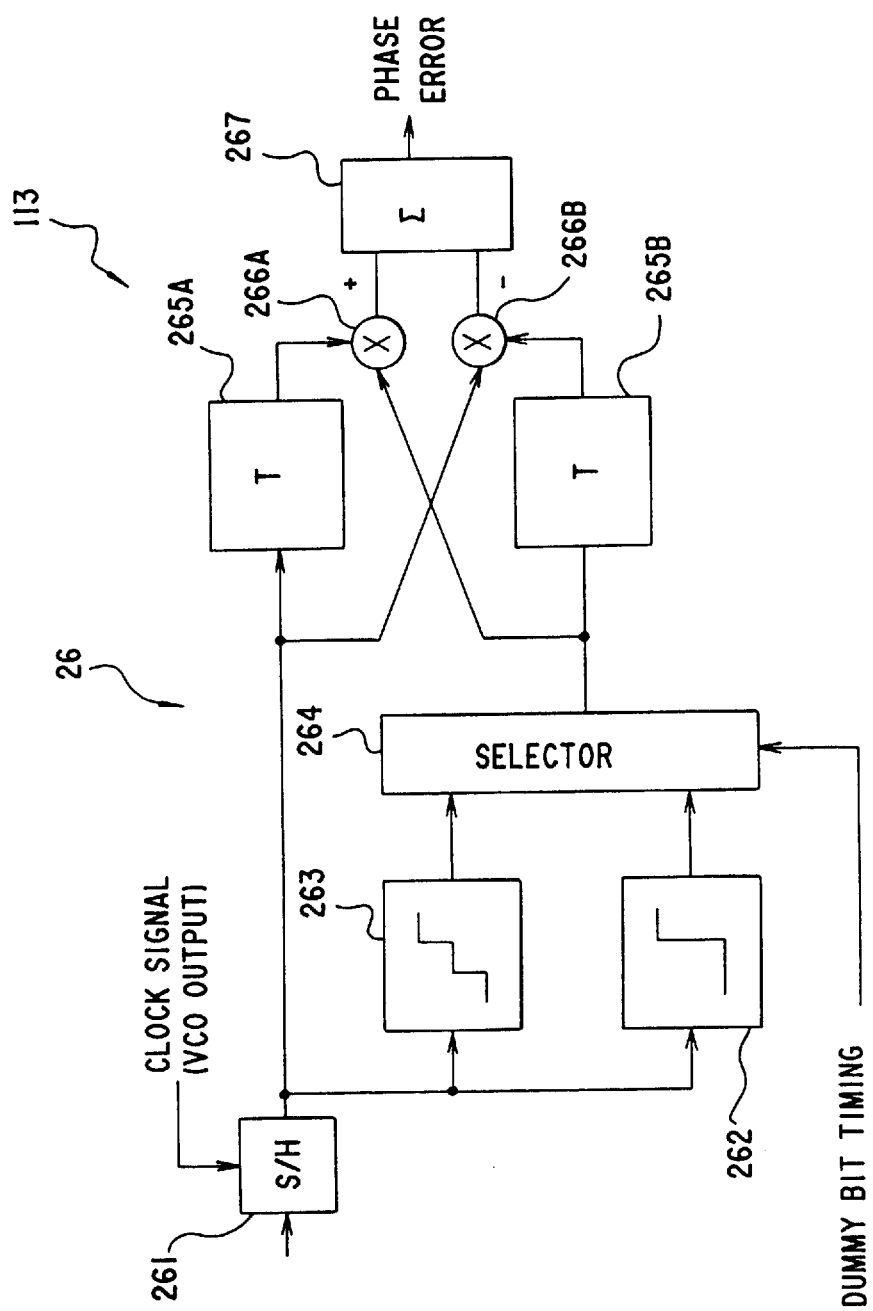
FIG. 22 is a block circuit diagram showing the construction of a phase comparison portion of a clock signal reproducing circuit on the reproducing side of the magnetic disk drive according to the thirteenth embodiment of the present invention.

FIG. 22 shows the thirteenth embodiment of the present invention, and is a block circuit diagram showing the construction of a phase comparison portion of the clock signal reproducing circuit 26 on the reproduction side of the magnetic disk drive 113. This embodiment comprises a sample holder 261, a binary judging circuit 262, a ternary judging circuit 263, a selector 264 for switching the outputs of the binary judging circuit 262 and the ternary judging circuit 263 by the dummy timing signal, two delay circuits 265A and 265B, two multipliers 266A and 266B, and an adder 267.

In the foregoing embodiments, the system described in Kurt H. Muller et al. "Timing Recovery in Digital Synchronous Data Receivers", IEEE, Trans., Communication, VOL. COM-24, No. 5, pp. 516–531, May 1976, is used for the clock signal reproducing circuit. In this embodiment, however, a binary judging circuit 262 is added to the data estimating portion so that binary judgement is made at the dummy bit and the error of the estimated value used for phase comparison of the clocks (phase error) is reduced.

Figure 23:
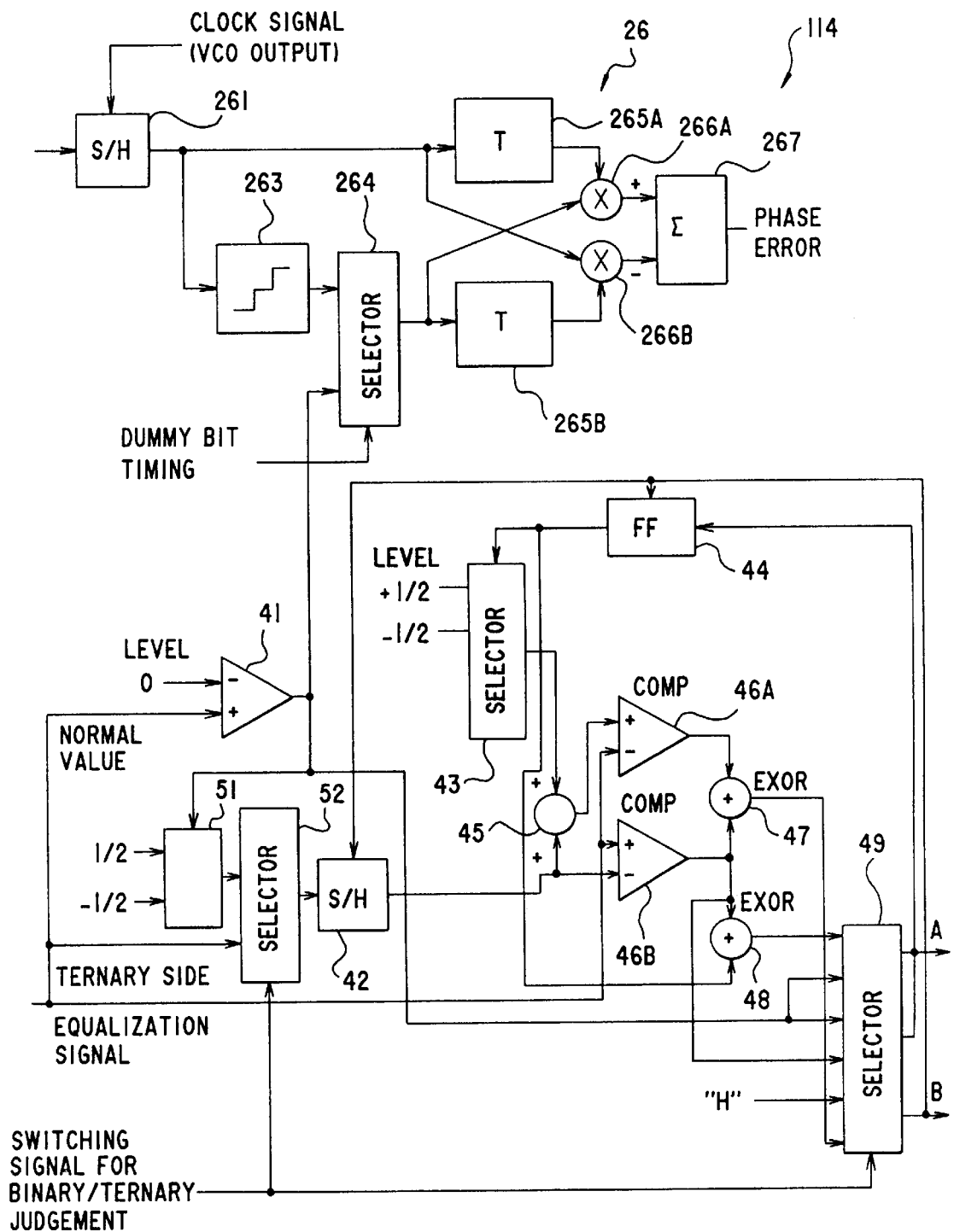
FIG. 23 is a block diagram showing the construction of the binary/ternary judgement portion of the magnetic disk drive according to the fourteenth embodiment of the present invention.

FIG. 23 is a block diagram showing the construction of the binary/ternary judging portion of the magnetic disk drive 114 according to the fourteenth embodiment of the present invention. In this embodiment, the maximum likelihood detection circuits 23, 23A, 23B with the binary/ternary judging circuit of the third embodiment explained with reference to FIG. 12 and the clock signal reproducing circuit 26 of the thirteenth embodiment explained with reference to FIG. 22 are combined with one another. In this instance, the comparator 41 of the maximum likelihood detection circuits 23, 23A, 23B with the binary/ternary judging circuit and the binary judging circuit 262 of the clock signal reproducing circuit 26 are accomplished by one binary judging circuit 41. As a result, the number of circuit components can be reduced.

Figure 24A:
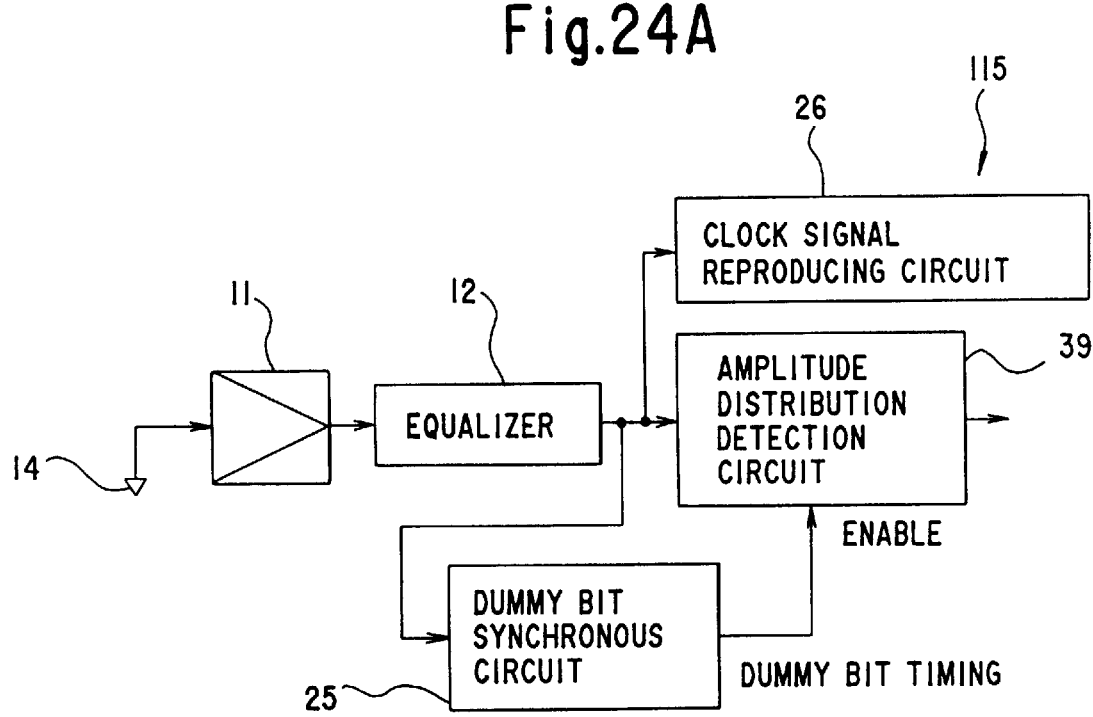
FIG. 24A is a block circuit diagram showing the construction wherein a circuit for measuring an equalization error is added to the magnetic disk drive according to the fifteenth embodiment of the present invention.
Figure 24B:
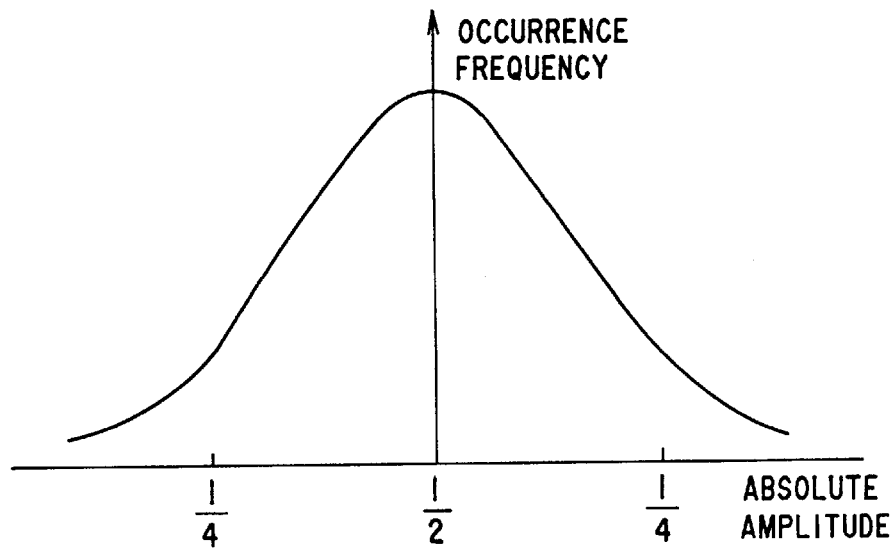
FIG. 24B is a diagram showing the distribution of the equalization errors measured in FIG. 24A.

FIG. 24A is a block circuit diagram showing the construction wherein an amplitude distribution detection circuit 39 for measuring the equalization error is added to the magnetic disk drive 115 in the fifteenth embodiment of the present invention, and FIG. 24B shows the distribution of the equalization error so measured. In this embodiment, the amplitude distribution detection 39 is disposed so as to measure the distribution of the amplitudes distributed as shown in FIG. 24B, and the equalization error is estimated by the amplitude distribution of the equalization signals of the dummy bits.

In the embodiments explained above, the processing is executed using the analog sample holder, but digital processing may also be used by disposing an A/D converter.

As explained above, the eight-bit data have been generated conventionally by looking up the ROM table or by executing complicated arithmetic operations for the codes of nine symbols having the consecutive 0 restrictions, but according to the present invention, it is only necessary to periodically insert the dummy bits. Therefore, the constructions of both encoders and decoders can be simplified. Though the error has been propagated in a maximum of 4 bytes in the past, the present invention can reduce the error propagation to the length of the dummy bit interval.

Accordingly, the present invention can use an ECC correction unit which is smaller than in the prior art, and can improve frame efficiency of ECC. Although it has not been possible in the past to fully utilize redundancy of the consecutive 0 restriction, an encoding gain of 1.32 FB can be expected even though dummy bits are used.

As described above, in the magnetic disk drive for demodulating the read data by the maximum likelihood detection method, the present invention can reduce the error propagation and can improve the encoding gain. Furthermore, the present invention can improve the processing speed of the maximum likelihood detection by parallel processing of maximum likelihood detection, and can easily improve the transfer rate.

While the invention has been particularly shown and described in reference to preferred embodiments thereof, it will be understood by those skilled in the art that changes in form and details may be made therein without departing from the spirit and scope of the invention.

I claim:

1. A magnetic disk drive for writing data to a magnetic disk by a head, equalizing a reproduced signal read out from said magnetic disk by a head at the time of reproduction, by using an equalization circuit for reproduced signals, and demodulating the data by effecting maximum likelihood detection for the reproduced signal after equalization, comprising:

a dummy bit insertion circuit for periodically inserting "1" as a dummy bit into a data string of write data to make run length limited code sequences;

maximum likelihood detection circuits with binary/ternary judging circuit, each being disposed at a post-stage of said equalization circuit of said reproduced signal, switching a threshold level by a timing signal provided from outside, effecting binary judgement at respective positions of a plurality of dummy bits in said reproduced signal after equalization and retrieving a path by regarding that a path merge unconditionally exists, and effecting ternary judgement at code strings for maximum likelihood detection;

a dummy bit removing means, operably coupled to said maximum likelihood detection circuits, for removing said dummy bits from detected data sequences of said maximum likelihood detection circuits with binary/ternary judging circuit, in accordance with a timing signal inputted from outside; and a dummy bit synchronous circuit, disposed at a post-stage of said equalization circuit of said reproduced signals; (a) for generating timing signals synchronized with the positions of said dummy bits in said reproduced signals after equalization, (b) m for outputting said timing signals to said maximum likelihood detection circuits with binary/ternary judging circuit and to said dummy bit removing means, and (c) for providing maximum likelihood detection in parallel by extracting a code string interposed by said dummy bits based on said timing signals generated by said dummy bit synchronous circuit.

2. A magnetic disk drive as set forth in claim 1, which further comprises:
a clock signal reproducing circuit for reproducing a clock signal from said reproduced signal after equalization.

3. A magnetic disk drive as set forth in claim 1, which further comprises:
a data scrambler disposed at a pre-stage of said dummy bit insertion circuit; and
a descrambler disposed at a post-stage of said dummy bit removal circuit on the reproduction side, and having the same key as said scrambler.

4. A magnetic disk drive as set forth in claim 1, wherein said maximum likelihood detection circuit with binary/ternary judging circuit includes a switching circuit for switching the reproduced signal and a normal value, and wherein a metric is initialized by said normal value at the position of said dummy bit.

5. A magnetic disk drive as set forth in claim 1, wherein a buffer for extracting a signal string from a dummy bit to a next dummy bit is disposed at a pre-stage of said maximum likelihood detection circuit with a binary/ternary judging circuit, a path in maximum likelihood detection is initialized by a signal at an initial stage of said buffer to thereby start retrieval, and a maximum likelihood path in maximum likelihood detection is decided by a signal at the final stage of said buffer.

6. A magnetic disk drive as set forth in claim 5, wherein said maximum likelihood detection circuit with a binary/ternary judging circuit includes two binary judging circuits for judging said dummy bits and the same number of ternary judging circuit as the number of code strings encompassed by said dummy bits, and said dummy bits and said code string encompassed by said dummy bits are simultaneously judged.

7. A magnetic disk drive as set forth in claim 5, wherein a plurality of sets of maximum likelihood detection portions are provided to said maximum likelihood detection circuits with binary/ternary judging circuits equipped with said buffer, a distributor for extracting said code strings interposed between said dummy bits and distributing them to said buffer of each of said sets is disposed at a pre-stage of each of a plurality of sets of said maximum likelihood detection portions, and an multiplexer is disposed at a post-stage of each of said maximum likelihood detection portions so that maximum likelihood detection can be detected in parallel.

8. A magnetic disk drive as set forth in claim 1, which further comprises:
a synchronous word generation circuit disposed in parallel with said dummy bit insertion circuit through a changeover switch, for writing asynchronous word; and
a dummy bit synchronous counter disposed in said dummy bit synchronous circuit for detecting said synchronous signal, and reset by said synchronous word detection circuit and by said synchronous signal so detected.

9. A magnetic disk drive as set forth in claim 1, wherein a register having an information bit length is disposed in a path memory portion of said maximum likelihood detection circuit with binary/ternary judging circuit, and judgement results are loaded in parallel from said path memory portion.

10. A magnetic disk drive as set forth in claim 1, wherein said dummy bit synchronous circuit includes a memory for storing equalized and distributed signals and a correlation circuit for examining correlation of data read out from said memory in each interval of said dummy bits, and synchronization of the positions of said dummy bits is established at an address having the greatest correlation.

11. A magnetic disk drive as set forth in claim 1, wherein said maximum likelihood detection circuit with binary/ternary judging circuit includes a memory for once storing equalized signals and a microprocessor, and synchronization of the positions of said dummy bits and maximum likelihood detection of binary/ternary judgement is processed by software.

12. A magnetic disk drive as set forth in claim 1, wherein said maximum likelihood detection circuit with binary/ternary judging circuit includes a binary judging circuit for judging only said dummy bits and a counter for counting the number of 0 judgements, and the error rate after equalization is measured.

13. A magnetic disk drive as set forth in claim 12, wherein said binary judging circuit of said maximum likelihood detection circuit with a binary/ternary judging circuit always operates, a terminal which is brought into an enable state by a timing signal from said dummy bit synchronous circuit is provided to said counter, and the number of 0 judgement can be counted only at the positions of said dummy bits.

14. A magnetic disk drive as set forth in claim 1, wherein a binary judging circuit for effecting binary judgement of a sampling signal is disposed in said clock signal reproducing circuit for effecting phase synchronization by the sampled and equalized signal, and a selector is disposed so as to select the output of said binary judging circuit at the positions of said dummy bits.

15. A magnetic disk drive according to claim 14, wherein said binary judging circuit is used also as said binary judging circuit disposed in said maximum likelihood detection circuit with a binary/ternary judging circuit.

16. A magnetic disk drive according to claim 1, wherein an amplitude distribution detection circuit for measuring the distribution of the amplitudes of an equalized signal is disposed at a post-stage of an equalized circuit of said reproduced signal, and estimation of an equalization error is made by the amplitude distribution of the equalized signal of said dummy bits.

17. A magnetic disk drive as set forth in claim 1, wherein an A/D converter for converting an analog signal to a digital signal is disposed at a post-stage of said equalization circuit of said reproduced signal, and processing after sampling is effected by digital signals.

18. A magnetic disk drive as set forth in any of claims 1 through 17, wherein said maximum likelihood detection circuit with binary/ternary judging circuit is combined with a partial-response circuit.

19. A magnetic disk drive as set forth in any of claims 1 through 17, wherein said maximum likelihood detection circuit with binary/ternary judging circuit is combined with partial-response class 4 circuit.

* * * * *